Aug. 7, 1945.   C. M. JAMESON   2,381,755
AUTOMATIC BRAKING DEVICE
Filed Sept. 24, 1942   7 Sheets-Sheet 3
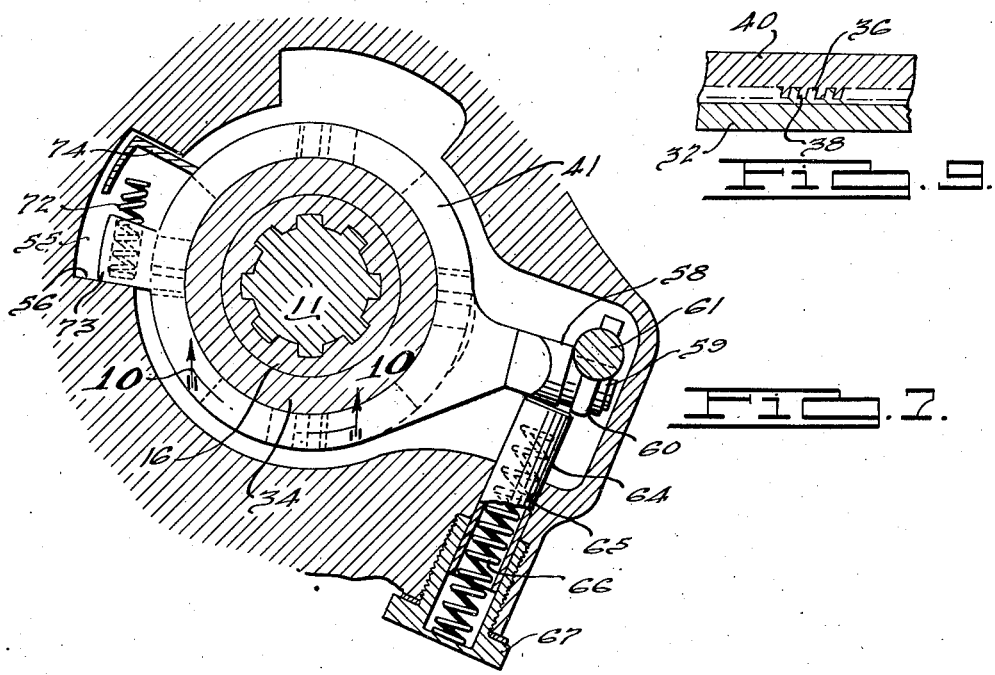
INVENTOR
Charles M. Jameson.
BY Harness, Dickey & Pierce
ATTORNEYS.

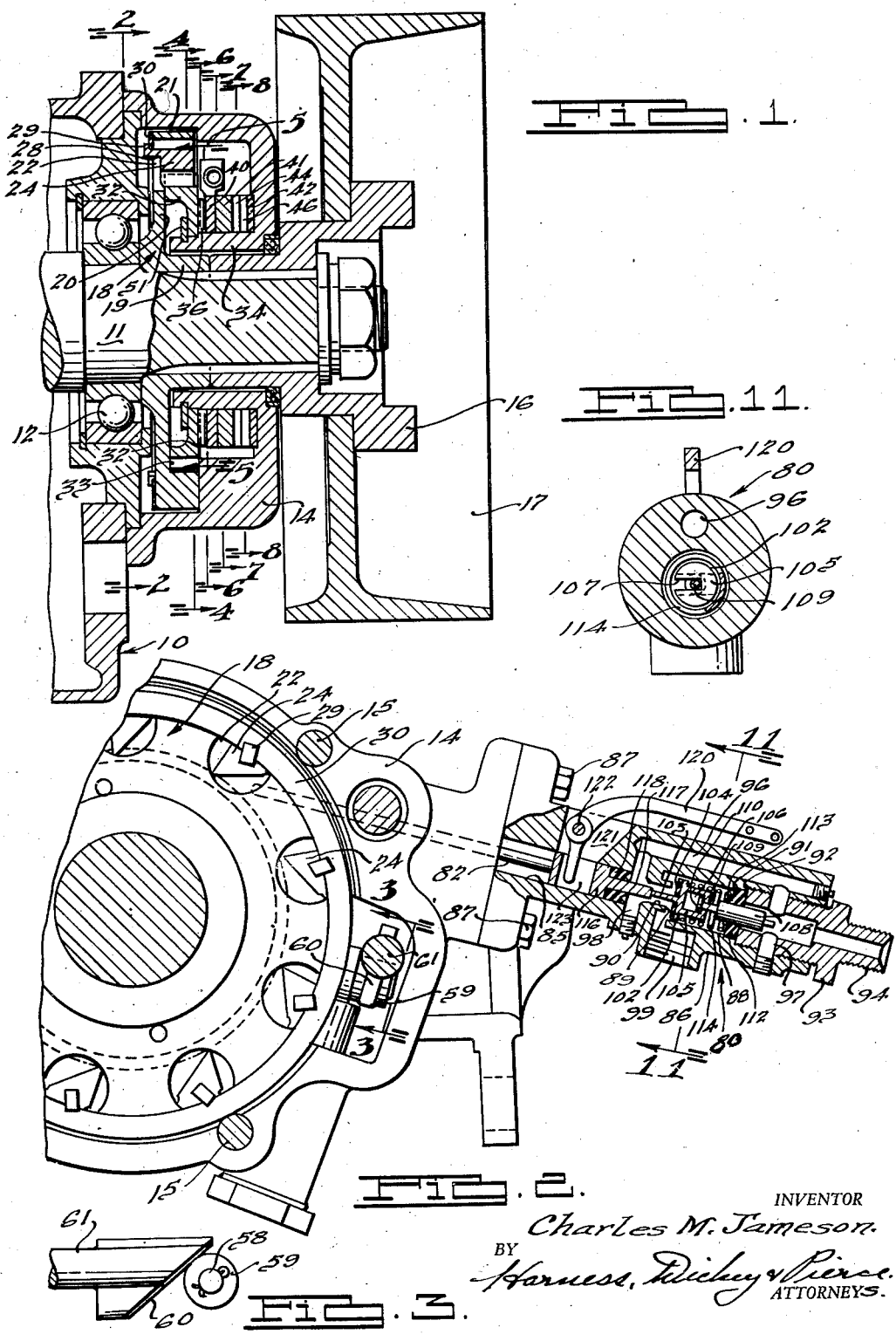

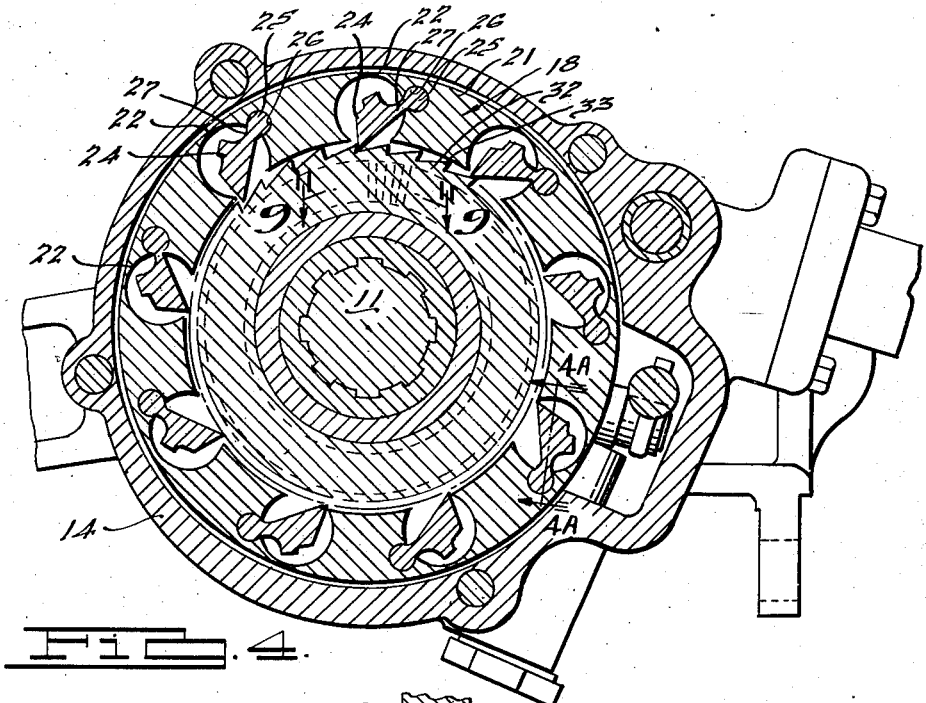
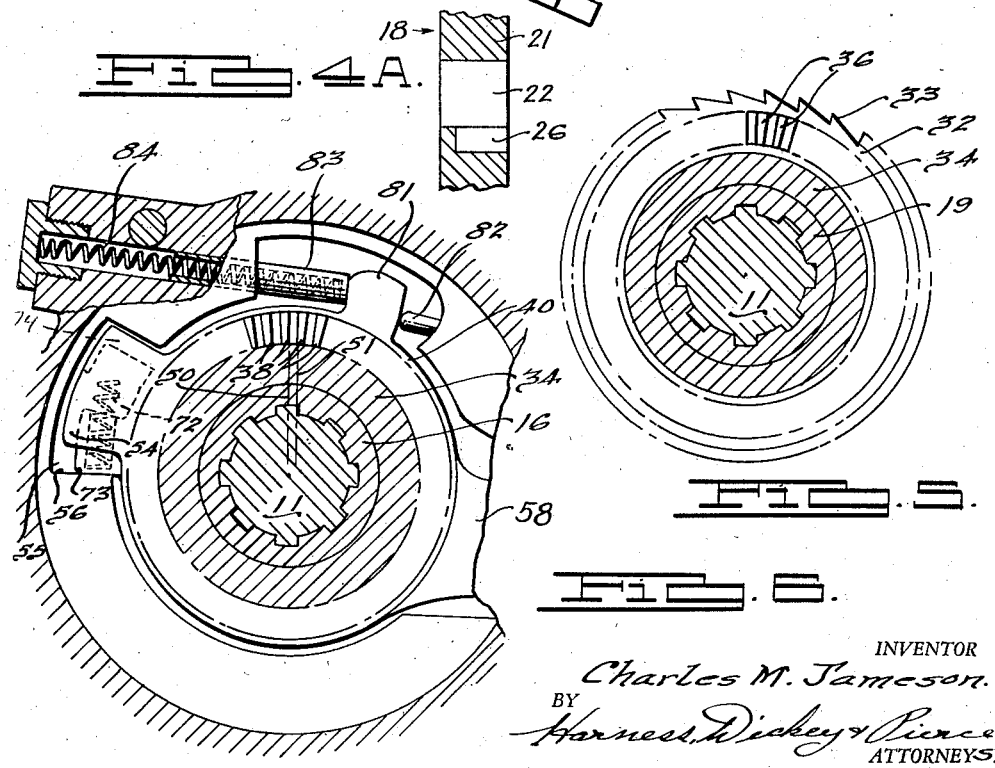

Aug. 7, 1945.  C. M. JAMESON  2,381,755
AUTOMATIC BRAKING DEVICE
Filed Sept. 24, 1942  7 Sheets-Sheet 4
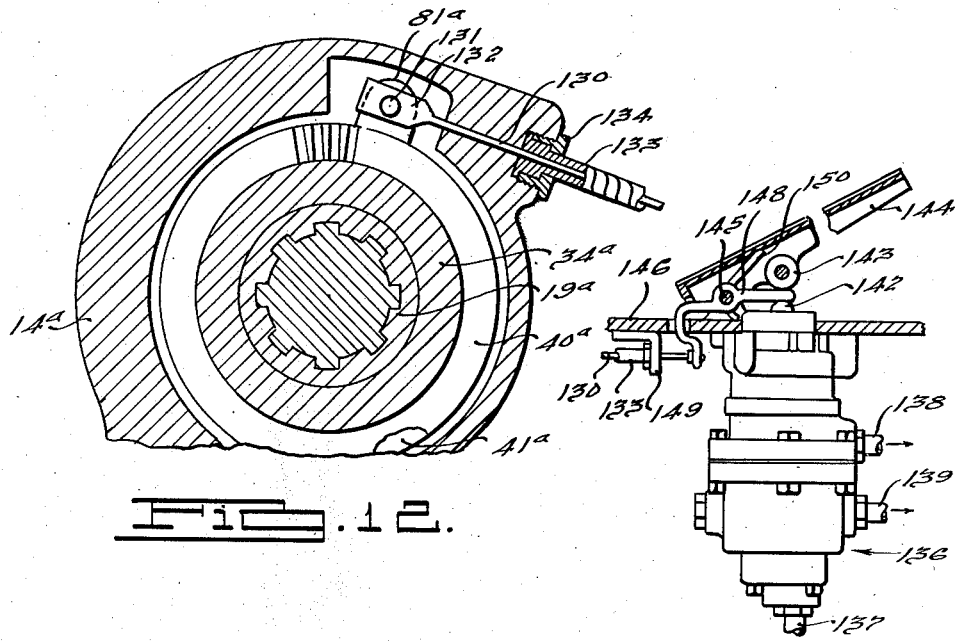
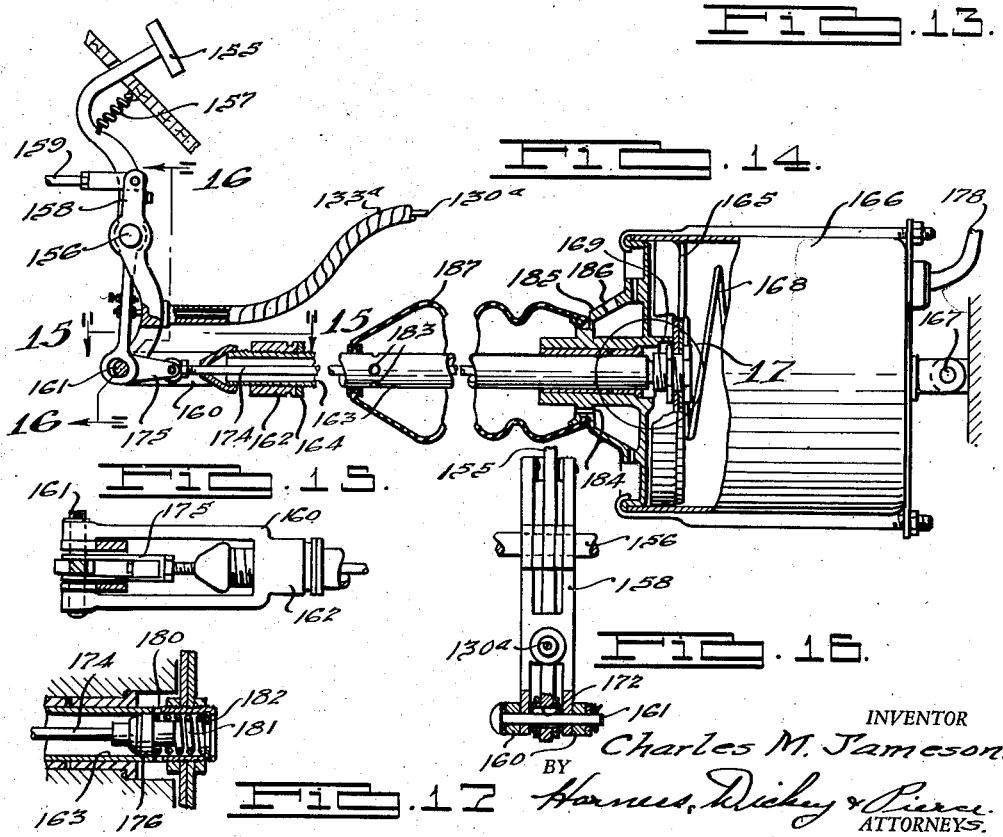
INVENTOR
Charles M. Jameson.
BY
Harness, Dickey & Pierce
ATTORNEYS.

Aug. 7, 1945.   C. M. JAMESON   2,381,755
AUTOMATIC BRAKING DEVICE
Filed Sept. 24, 1942   7 Sheets-Sheet 5
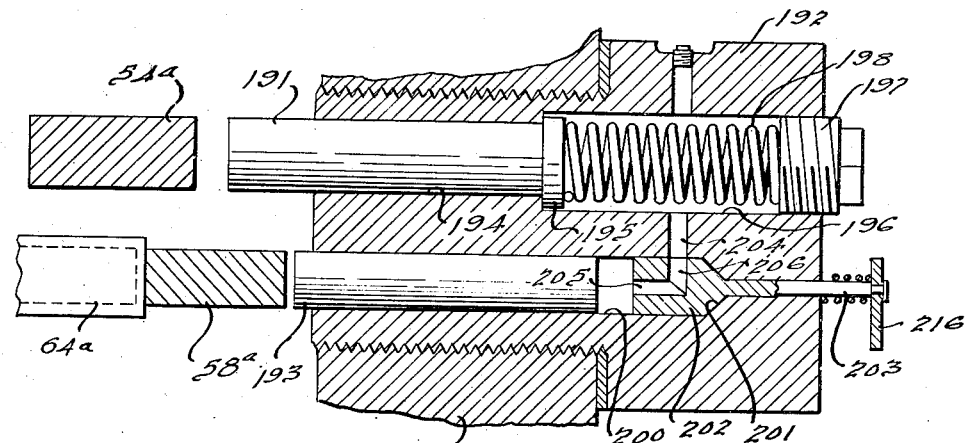
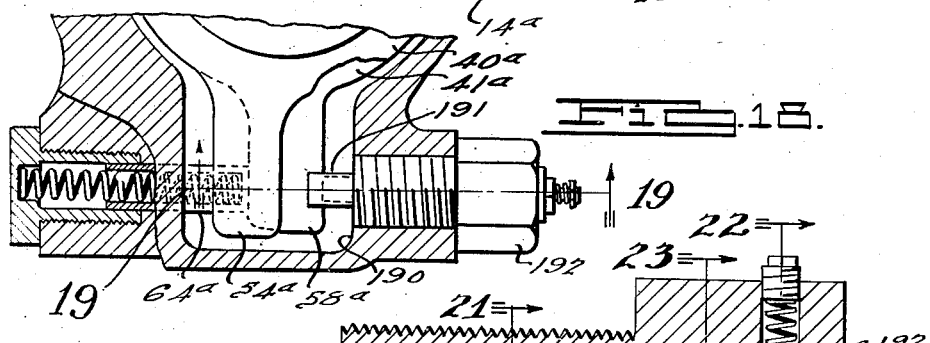
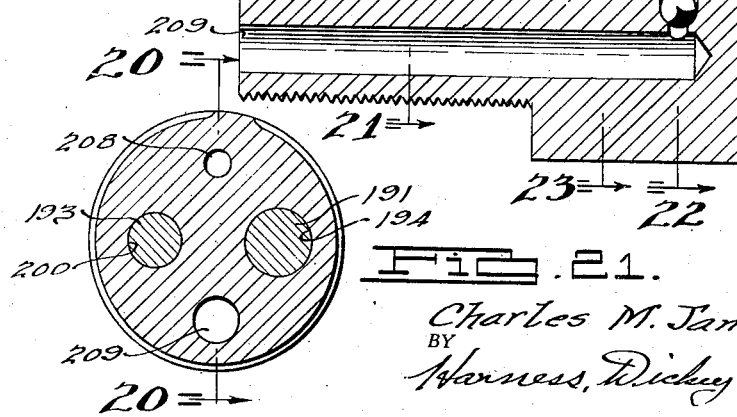
INVENTOR
Charles M. Jameson.
BY
Harness, Dickey & Pierce
ATTORNEYS.

Aug. 7, 1945.  C. M. JAMESON  2,381,755
AUTOMATIC BRAKING DEVICE
Filed Sept. 24, 1942  7 Sheets-Sheet 6
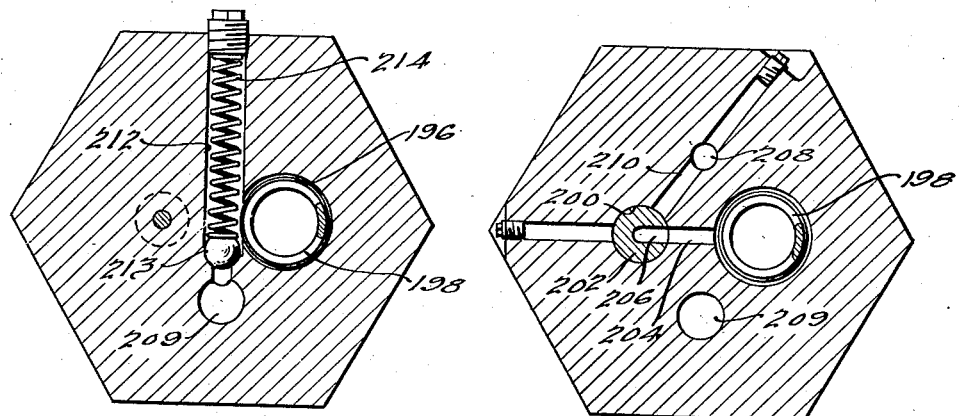
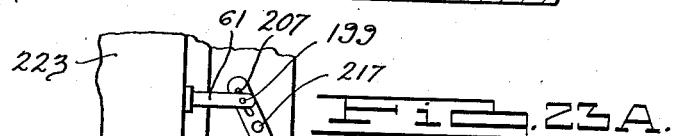
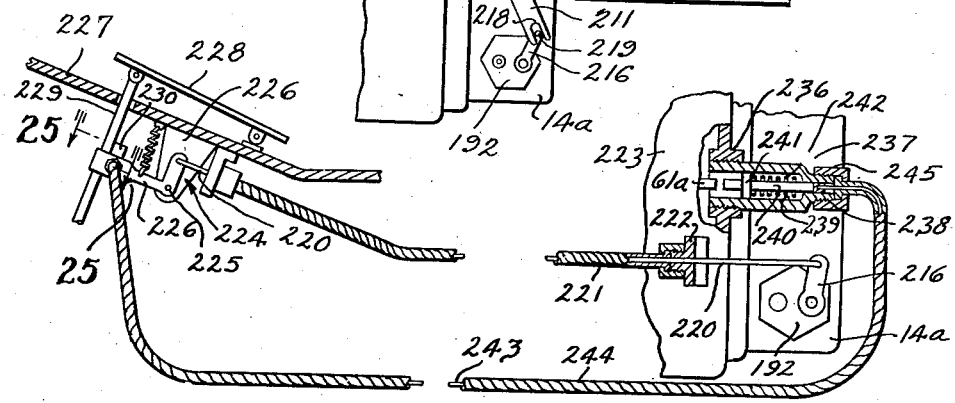
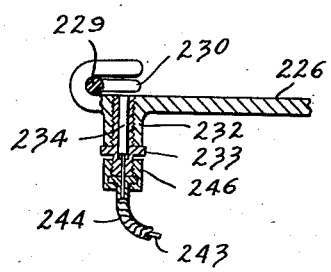
INVENTOR
*Charles M. Jameson.*
BY *Harness, Dickey & Pierce*
ATTORNEYS.

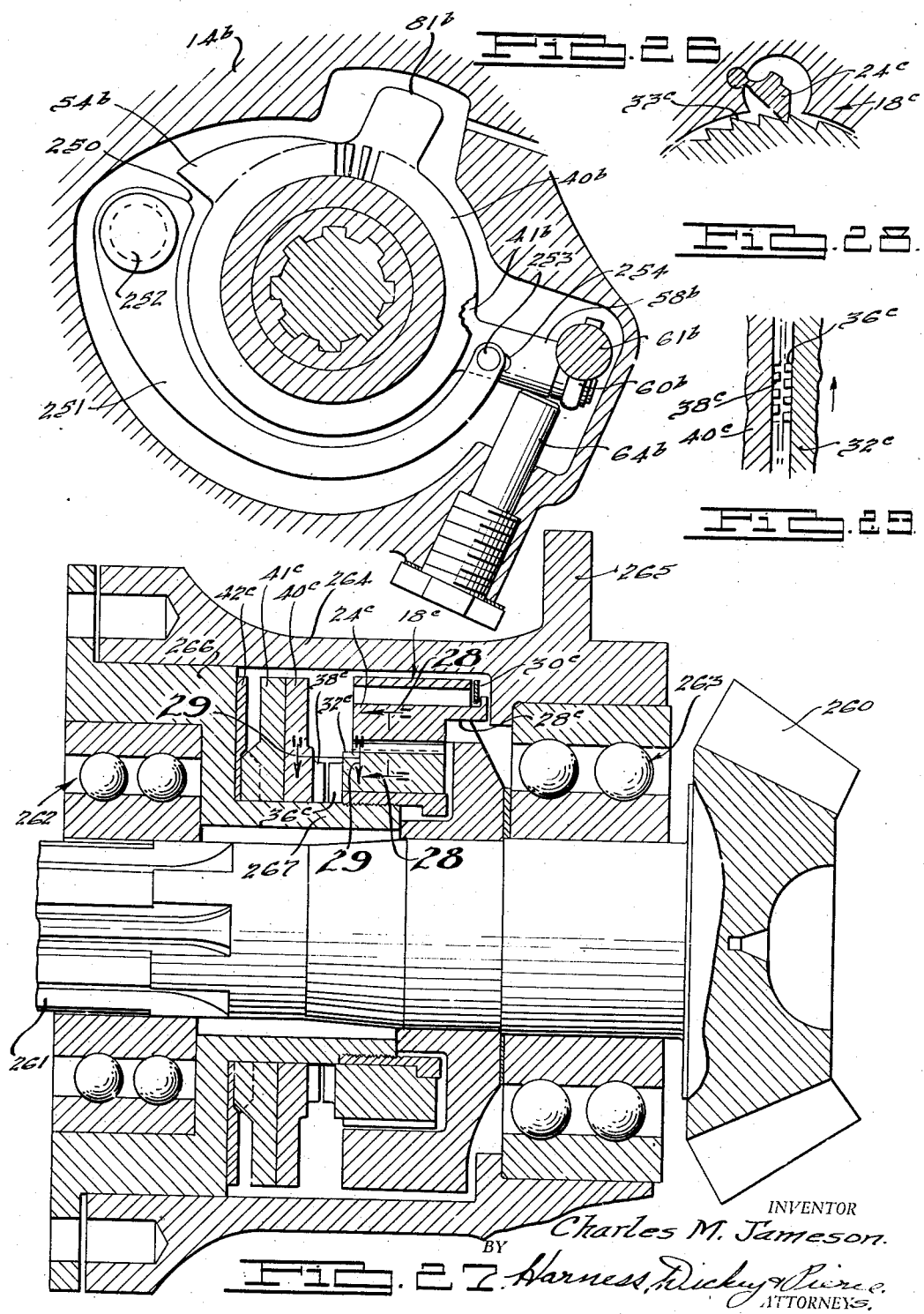

Patented Aug. 7, 1945

2,381,755

UNITED STATES PATENT OFFICE 2,381,755

AUTOMATIC BRAKING DEVICE

Charles M. Jameson, Detroit, Mich.

Application September 24, 1942, Serial No. 459,536

20 Claims. (Cl. 192—3)

The present invention relates to an apparatus for maintaining a vehicle against unauthorized movement, and in general it embodies improvements upon the type of apparatus disclosed in applicant's prior patent, No. 2,218,398, wherein means are provided for automatically maintaining the brakes of a motor vehicle applied after the vehicle has been brought to rest by application of the brakes in combination with means acting automatically when the vehicle is driven forward to render the brake holding means inoperative and thereby permit disengagement of the brakes. The device of the prior patent, as well as that of the present invention, also incorporates means acting automatically to prevent unauthorized retrograde movement of the vehicle.

It is the general object of the present invention to improve and simplify the various details of construction of the brake and vehicle holding device disclosed in the above mentioned patent.

It is another object of the present invention to provide an improved check valve mechanism for use in fluid braking systems to hold the fluid actuated brakes engaged, which valve is operated under control of a holding mechanism associated with a driven element of the vehicle power transmission system.

Another object of the invention is to provide an improved apparatus of the type mentioned adapted to cooperate with power actuated brakes in which the motive power is in the form of either air pressure or vacuum operated motors.

Another object of the invention is to provide an automatic means for applying power actuated brakes in the event of an unauthorized backward rolling movement of the vehicle.

Another object of the present invention is to provide improved means for rendering the holding device inoperative when it is desired to drive the vehicle rearwardly or otherwise.

A more specific object is to provide a hydraulic release mechanism for rendering the holding device inoperative.

Another object of the present invention is to provide an improved control means for the mechanism which renders the holding device inoperative.

Another object of the invention is to provide improved means for causing re-engagement of the holding device after it has been rendered inoperative, which means is so constructed as to cause re-engagement only after the vehicle brakes are applied.

Other objects and advantages of the invention will become apparent from the following specification, the drawings relating thereto, and from the claims hereinafter set forth.

In the drawings, in which like numerals are used to designate like parts in the several views throughout:

Figure 1 is a longitudinal section through one form of the present invention showing the mechanism mounted at the rear of an ordinary transmission housing;

Figure 2 is a fragmentary section taken on the line 2—2 of Figure 1, showing the check valve mechanism in longitudinal section;

Figure 3 is a fragmentary view taken on the line 3—3 of Figure 2;

Figure 4 is a transverse section taken on the line 4—4 of Figure 1;

Figure 4a is a fragmentary section taken on the line 4a—4a of Figure 4 with the pawl removed;

Figure 5 is a transverse section taken on the line 5—5 of Figure 1;

Figure 6 is a transverse section taken on the line 6—6 of Figure 1;

Figure 7 is a transverse section taken on the line 7—7 of Figure 1;

Figure 8 is a transverse section taken on the line 8—8 of Figure 1;

Figure 9 is a fragmentary section taken on the line 9—9 of Figure 4;

Figure 10 is a fragmentary section taken on the line 10—10 of Figure 7;

Figure 11 is a view of the check valve taken on the line 11—11 of Figure 2;

Figure 12 is a view corresponding to Figure 6 but of a slightly modified form of the invention;

Figure 13 is a view partly in section showing an air brake control valve mechanism and means for connecting it to the device of Figure 12;

Figure 14 is a longitudinal sectional view with parts broken away showing a vacuum follow-up brake actuator mechanism and means for connecting the same to the mechanism of Figure 12;

Figure 15 is a fragmentary section taken on the line 15—15 of Figure 14;

Figure 16 is a view taken on the line 16—16 of Figure 14;

Figure 17 is an enlarged sectional view of the valve mechanism encircled in Figure 14;

Figure 18 is a fragmentary view corresponding to Figure 6, showing a modified form of mechanism for releasing the unit;

Figure 19 is a fragmentary longitudinal horizontal section through the control valve mechanism taken on the line 19—19 of Figure 18;

Figure 20 is a vertical longitudinal section through the control valve mechanism of Figure 18;

Figure 21 is a section taken on the line 21—21 of Figure 20;

Figure 22 is a section taken on the line 22—22 of Figure 20;

Figure 23 is a section taken on the line 23—23 of Figure 20;

Figure 23a shows one form of mechanism for controlling the operation of the release valve disclosed in Figures 18 to 23, inclusive;

Figure 24 discloses another mechanism for controlling the operation of the release valve disclosed in Figures 18 to 23, inclusive;

Figure 25 is a fragmentary section taken on the line 25—25 of Figure 24;

Figure 26 is a view corresponding to Figure 6, disclosing a further modified form of mechanism for rendering the unit inoperative;

Figure 27 is a longitudinal section showing the unit mounted in the pinion housing of the rear axle;

Figure 28 is a fragmentary section taken on the line 28—28 of Figure 27; and

Figure 29 is a fragmentary section taken on the line 29—29 of Figure 27.

Figures 1 to 11, inclusive, of the drawings illustrates one form of the invention comprising a mechanical holding unit in combination with a novel and improved form of check valve mechanism for the braking system of a vehicle. The mechanical unit employed is generally similar to that disclosed in applicant's prior patents, Nos. 2,135,897 and 2,218,398, but contains a number of improved features.

As best shown in Figure 1, the mechanical unit in the present case is mounted at the rear of the vehicle transmission on the driven shaft thereof. The transmission casing is indicated generally at 10 and the driven shaft of the transmission at 11. The driven shaft 11 is mounted in a ball bearing 12 carried by the casing 10. An auxiliary housing 14 encloses the mechanical holding unit of the device and is bolted or otherwise fixed to the transmission casing in any suitable manner, as by bolts 15 shown in Figure 2. The shaft 11 projects rearwardly through and beyond the housing 14 and carries a universal joint hub yoke 16 upon which is mounted an emergency brake drum 17 in the conventional manner.

The mechanical unit includes a pawl carrier indicated generally at 18 comprising a hub 19, which is keyed or otherwise fixed to the shaft 11, a web portion 20, and a thickened annular rim portion 21 adapted to carry the pawls.

As best shown in Figure 4, the pawl carrier incorporates an improved and simplified pawl mounting arrangement consisting of a plurality of drilled holes 22 which extend entirely through the rim 21 and which intersect the inner annular surface of the rim 21 to form inwardly facing openings through which the points of the pawls may project. Each opening 22 receives a pawl 24 provided with an integral trailing end 25 of generally cylindrical configuration which is journaled in a drilled hole 26. The drilled holes 26 are parallel to and intersect laterally the holes 22 in order to provide a communicating opening between the holes 26 and 22 through which the shank 27 of the pawl extends. The incomplete cylindrical surface of the drilled holes 26 are sufficiently complete to retain the end portions of the pawls against displacement radially of the drilled openings without preventing a free pivotal movement of the pawls about the axis of the drilled openings.

As best shown in Figure 4a, the drilled holes 26 do not extend entirely through the rim 21, but terminate short of the left-hand face of the rim, as viewed in Figures 1 and 4a, in consequence of which the pawls 24 cannot be displaced from the pawl carrier in a direction toward the left, as viewed in Figures 1 and 4a.

Each pawl, as best shown in Figure 1, is provided with an integral, rearwardly projecting arm 28 having an upwardly extending end 29. The arms 28 project beyond the left-hand face of the rim 21 of the pawl carrier and, as best shown in Figure 2, support a flat ring 30 which lies parallel and close to the left-hand face of the pawl carrier rim, as viewed in Figure 1.

The upstanding ends 29 on the arms 28 overlie the outside of the ring 30 to prevent displacement of the ring. It will be observed that as a result of this arrangement the ring 30 prevents displacement of the pawls 24 in a right-hand direction, as viewed in Figure 1.

One important function of the ring 30 is to counteract the effect of centrifugal force on the pawls and thus insure that the pawls will engage and maintain engagement with the hereinafter described ratchet wheel, as fully disclosed in applicant's prior Patent No. 2,218,398.

The present pawl carrier is very simply made by ordinary drilling operations to form the openings 22 and 26, and hence is simpler and less expensive than the particular form of pawl carrier disclosed in said prior patent. In addition, the novel location of the ring 30 greatly facilitates assembly.

Pawls 24 are adapted to co-operate with a ratchet wheel 32 having a plurality of ratchet teeth 33, best shown in Figure 4. The arrangement and number of pawls and ratchet teeth are such that one of the pawls will be in tooth holding position for each minute increment of movement of the pawl carrier relative to the ratchet wheel. Thus, as best shown in Figure 4, the uppermost pawl 24 is in holding engagement with a tooth of the ratchet wheel. On a slight increment of movement of the pawl carrier to the right, as viewed in Figure 4, the pawl to the right of the uppermost pawl will drop into engagement. On the next increment of such movement the next pawl will engage, and so on clockwise around the pawl carrier. Since there are nine pawls in the embodiment disclosed, there will be nine positions of engagement within a movement equal to the distance between the two adjacent ratchet teeth.

The ratchet wheel 32 is journaled on an internal, forwardly directed, annular projection 34 on the housing 14, as best shown in Figure 1. It will be observed that when the shaft 11 is rotating in a direction corresponding to forward movement of the vehicle the pawl carrier will move clockwise, as viewed in Figure 4, and the pawls will run idly over the teeth of the ratchet wheel; but when the vehicle moves rearwardly, one of the pawls will engage a tooth of the ratchet wheel and rotate or tend to rotate the ratchet wheel 32 in a counterclockwise direction, as viewed in Figure 4. The right-hand face of the ratchet wheel 32, as viewed in Figure 1, is provided with a plurality of dog clutch teeth 36, best shown in Figure 5, which are adapted to mesh with a corresponding set of dog clutch teeth 38 on an annular brake holding element 40, which is also journaled on the annular housing projection 34.

The dog clutch teeth on the ratchet 32 and holding member 40 are normally held in engagement by an annular movable cam ring 41 cooperating with a stationary annular cam ring 42. Cam ring 41 is journaled on the annular projection 34, while cam ring 42 is mounted on the same projection but, as best shown in Figure 8, is fixedly secured to the rear wall of the housing 14 in any suitable manner, as by screws 43. Movable cam ring 41 is provided with a plurality of circumferentially spaced projections 44 having sloping cam surfaces 45.

As best shown in Figure 10, the stationary cam ring is provided with a plurality of similarly spaced projections 46 having sloping cam surfaces 47. When the projections 44 and 46 are in engagement with each other, as shown in Figures 1 and 10, the dog clutch teeth on ratchet 32 and holding member 40 are in engagement; but on rotation of the cam ring 41 clockwise, as viewed in Figure 7, projection 44, as viewed in Figure 10, will move to the left with reference to projection 46 until the projection 46 clears the projection 44. On such cam release the dog clutch teeth 36 and 38 may disengage and their configuration is such, as shown in Figure 9, that they will automatically disengage if a force is being exerted tending to rotate the ratchet wheel counterclockwise with reference to the holding ring 40, as viewed in Figures 4 to 6. On such movement the ratchet wheel 32, as viewed in Figure 9, will tend to move to the left with reference to the holding ring 40, and it will be noted that the sides of the teeth 36 and 38 are sloped in such a manner that the resulting torque load will tend to cause the teeth to separate, the slope being exerted tending to rotate the ratchet wheel the material of which the teeth are made. For steel clutch teeth, an angle of ten degrees (10°) with respect to the plane of the ratchet wheel has been found satisfactory to cause such automatic release.

As best shown in Figures 5 and 6, the dog clutch teeth 36 and 38 have a novel form which greatly simplifies the manufacture thereof. Thus, it will be noted that the spaces between the teeth 38 and the spaces between the teeth 36 are of uniform width, that is to say the sides of adjacent teeth 36 on the ratchet are parallel to each other and, consequently, may be formed by a single straight milling cut. The resulting teeth taper inwardly, but this is immaterial inasmuch as it is only necessary in the present device for a load to be taken on the clutch teeth in one direction. Accordingly, the load carrying side of each clutch tooth 36 lies in the same plane when the clutch is engaged as the co-operating load carrying side on one of the clutch teeth 38. The non-load carrying sides will not make surface contact, but this is immaterial since no reverse load can be applied to the teeth because of the one-way driving connection between the ratchet and pawl carrier. One simple method of locating the load carrying sides of the two sets of clutch teeth so that they will properly engage is to make the load carrying side of each slot project radially, as indicated by the dotted line 50 in Figure 6. Then the opposite side of the space will extend parallel to the line 50 but will not intersect the axis, as shown by the dotted line 51. If both sets of clutch teeth are made in exactly this manner, they will properly engage when meshed.

So long as the cam rings 41 and 42 are in the positions illustrated in Figures 1, 4 and 10, the tendency of the clutch teeth 36 and 38 to separate under load is resisted by the cams and the reaction force acting against the ratchet 32 is taken by a snap ring 51 mounted on a slot on the inner end of the annular projection 34.

The parts are shown in the drawings in their normal or operating position, that is the position they assume when the brake holding device is set to operate and the vehicle is moving forwardly. During these conditions, the ratchet 32 and holding ring 40 act as one unit. However, during forward rotation the pawl ring 18 rotates clockwise, as viewed in Figures 2 and 4, and, consequently, the ratchet 32 and holding ring 40 are free to move in either direction.

As best shown in Figure 6, holding ring 40 is provided with an integral projection 54 which extends into a recess 55 in one side of the housing 14. One radially extending wall 56 of the recess defines an abutment surface which is engaged by the projection 54 to limit counterclockwise rotation of the holding ring 40. Since this direction of rotation of the ring 40 occurs when the vehicle moves rearwardly, it is apparent that the projection 54 an abutment 56 positively limit rearward movement of the vehicle by restraining the propeller shaft, rear axle and wheels from rotation in a rearward direction. The mechanism so far described, therefore, is effective automatically to prevent the vehicle from rolling backwardly down a hill. However, by the same token, the mechanism would prevent intentional rearward motion of the vehicle and, consequently, it is for that reason that the cam rings and clutch arrangement are provided to permit disengagement of the holding ring 40 from the ratchet wheel 42. Any suitable means may be provided to shift the cam ring 41 when it is desired to drive the vehicle rearwardly, but the particular means illustrated, as best shown in Figures 3 and 7, is designed to effect clutch release when the reverse gear shift rail of the transmission is moved in a direction to complete engagement of the reverse gearing. Referring to Figure 7, the cam ring 41 is provided with an arm 58 upon the end of which is journaled a roller 59 which, in turn, is adapted to be engaged by a cam 60 mounted on an extension 61 of the reverse gear shift rail. When the reverse gear shift rail is moved rearwardly in order to shift the transmission into reverse gear, cam 60 engages roller 59, thereby rotating cam ring 41 clockwise, as viewed in Figure 7, and disengaging the projections 44 and 46 on the cam rings 41 and 42. As soon as the flat tops of the cam projections 44 and 46 are disengaged by cam 60, the load on the clutch teeth causes automatic disengagement of the clutch and also completes disengagement of the sloping cam surfaces 45 and 47. As a result of this arrangement, the flat tops of the teeth 44 and 46 are disengaged during the limited idle movement of the reverse shift rail 61 before the reverse gearing actually meshes. So long as the flat tops of the teeth 44 and 46 are disengaged before the reverse gearing meshes, no harm can be done because any load thrown on the clutch teeth 36 and 38 incident to actual engagement of the reverse gearing will complete the releasing movement of cam ring 41 and separation of the clutch teeth 36 and 38.

Inasmuch as the clutch teeth 36 and 38 may be released when they are subject to the full load incident to holding the vehicle against rolling backward downhill, it is necessary to use a large number of very small teeth in order to distribute the load. Otherwise, there would be a tendency on release to damage the corners of the teeth.

Plunger 64, slidable in a bore 65 in the wall of the casing and urged inwardly by a spring 66, normally acts on lever 58 in a direction tending to return it to the position shown in Figure 7. An adjusting plug 67 is provided for adjusting the tension of the spring 66.

When the vehicle is shifted out of reverse gear, the spring pressed plunger 64 tends to cause the cam surface 45 to ride up on the cam surface 47 and thereby bring the clutch teeth 36 and 38 into engagement. However, it will be noted that the clutch teeth 36 and 38 have flat top portions and that the width of the teeth is sufficient to substantially fill the spaces of the companion clutch element. Moreover, a very large number of small clutch teeth are provided. Consequently, if the vehicle is moving in reverse at the time the transmission is shifted out of reverse gear the relative movement between the ratchet 32 and the holding ring 40 will prevent the clutch teeth from meshing with each other. Under these circumstances, the tops of the teeth merely ride on each other, even though they are subject to the force exerted by the spring actuated cams 45 and 47 tending to force them into mesh. Actual meshing will not occur until the vehicle stops and relative movement between the ratchet 32 and the holding ring 40 ceases. The use of small teeth is important in this connection since it renders more likely juxtaposition of the teeth at the time relative rotation between the clutch elements 32 and 40 ceases. Moreover, in some cases the elements 32 and 40 will stop in such a position that the teeth 36 and 38 will not engage. If, under these conditions, the vehicle starts to roll rearwardly downhill, the resulting movement of the ratchet wheel 32 will bring the teeth into position to permit engagement. Since the teeth are very small, the ratchet will not be able to pick up any appreciable speed before this occurs.

The tension exerted by spring 66 may be made sufficiently strong to cause re-engagement of the clutch teeth without any other assistance, but in some cases it is desirable to keep the brake holding unit inoperative even after the transmission is shifted out of reverse gear and the vehicle is brought to a stop. Such a need arises, for example, when one wheel of the vehicle is in a hole and there is insufficient traction, in which event it is necessary to rock the vehicle back and forth. Accordingly, means are provided, as best shown in Figure 7, for causing reengagement of the clutch teeth 36 and 38 only after the transmission is shifted out of reverse gear and the vehicle brakes are applied. In order to accomplish this result, the tension on spring 66 is either entirely eliminated or reduced to an amount insufficient of itself to shift the cam 41 against the influence of whatever friction is present and an auxiliary spring 72 is mounted in a projection 73 integral with the cam ring 41. Spring 72 seats within a blind socket in projection 73 and projection 73 and spring 72 lie in the previously described recess 55. The free end of spring 72 is adapted to be compressed by a rearwardly projecting wall 74 on the previously described projection 54 of the holding ring 40 when the holding ring is rotated counterclockwise, as viewed in Figures 6 and 7. It will be noted that, as viewed in Figure 7, clearance is provided between the free end of the spring 72 and the rearwardly projecting wall 74. This clearance is sufficient to allow the holding ring 40 to rotate counterclockwise during brake application without subjecting the spring 72 to compression. The end of the spring under such conditions should just contact the wall 74. As hereinafter brought out, when the vehicle brakes are applied manually the holding ring 40 will be rotated counterclockwise from the position shown in Figures 6 and 7 to a position in which the projection 54 contacts or nearly contacts the abutment 56. If the cam ring 41 is in its released position during such counterclockwise movement of the holding ring 40, the rearwardly projecting wall 74 will compress spring 72, thereby exerting sufficient force upon the cam ring 41 to rotate it in a counterclockwise direction and thereby effect engagement of the clutch teeth 36 and 38, in the manner previously described.

If the parts are so proportioned that the rotation of the holding ring 40 during manual brake application equals or exceeds the rotation of cam ring 41 from cam release to full cam engagement, the spring pressed plunger 64 may be dispensed with altogether since in that event spring 72, alone, will effect engagement of the dog clutch teeth when the brake is applied. However, it is of advantage to reduce the movement of the holding ring 41 during brake application as much as possible, and it has been found that even though the movement of the holding ring is less than the movement of the cam ring the above described clutch engagement can be achieved by making spring 72 relatively stiff and by adjusting the spring 66 so that it is just insufficient to overcome static friction. In that event, spring 72, when loaded incident to manual application of the brakes, starts the clutch engaging movement of cam ring 41 and the light spring 72 carries the cam ring, once it has started moving, to its completely engaged position, shown in Figure 10.

The clearance shown between the free end of spring 72 and wall 74 is not essential, but if spring 72 contacts wall 74 when the parts are in the position shown in Figure 7, the spring 72 will resist counterclockwise rotation of the holding ring during brake application and, consequently, it would be necessary to eliminate spring 84 or reduce its tension to compensate.

By providing means, as above described, to delay re-engagement of the clutch teeth after the transmission has been shifted out of reverse gear until the brakes are applied is of advantage because it permits the driver to rock the car back and forth in order to get out of a hole when there is insufficient traction. The fact that the device does not re-engage until the brakes are applied is not a disadvantage because the only circumstances under which it is desirable for the device to operate are those in which it would be natural to apply the brakes. Once the brakes are applied, the device becomes operative and will either prevent retrograde movement of the vehicle, as previously described, or maintain the brakes applied in the manner hereinafter set forth.

As previously indicated, the device is also effective to maintain the brakes applied after they have been applied either manually or by power means in the usual manner and the vehicle is brought to a stop. The means for accomplishing this function, as best shown in Figures 2 and 6, comprises a valve mechanism indicated generally at 80, the control of which is in part under the influence of the braking system of the vehicle and in part under the influence of the holding ring 40. As best shown in Figure 6, the holding ring 40 has an upward projection 81 which is normally held in engagement with a rod 82 by means of a plunger 83 which bears against the opposite side of the projection 81 and is urged to the right, as viewed in Figure 6, by means of a spring 84. The rod 82 projects through a suitable opening in the housing 14 into an axial bore 85 in the valve housing 86. The valve housing 86 is secured to a suitable boss on the housing 14 by means of cap screws 87. It will be observed that as a result of this construction the holding ring 41 is normally held in its extreme clockwise rotative position by means of the spring pressed plunger 83, as shown in Figure 6, in which position the rod 82 is likewise in its extreme right-hand position, as shown in Figure 2.

The valve housing 86 is provided with a central longitudinal bore 88 at the left hand end of which is an upstanding annular valve seat 89 of smaller diameter than the bore 88. The opening 90 in the valve seat 89 communicates with the bore 85 of the housing. At the right-hand end of the central bore 88 the bore is enlarged to define a shoulder 91 and to the right of the shoulder 91 is again enlarged to define a shoulder 92. That portion of the bore to the right of shoulder 92 is threaded to receive a plug 93 having an externally threaded fitting 94 which is adapted for connection to the pressure supply line of a fluid braking system. The braking system may be either air or hydraulic and, if hydraulic, may be operated either manually or by a power booster apparatus. The particular form of valve illustrated in the drawings is designed for use in a hydraulic braking system and, consequently, the fitting 94 is connected to the pressure line from the master cylinder of the braking system. The housing is also provided with an auxiliary longitudinal bore 96 extending parallel to the central bore 88. A cross bore 97 connects the interior of the plug 93 with the auxiliary bore 96 and a second cross bore 98 connects bore 85 with the auxiliary bore 96 at the left-hand side of the valve seat 89. Cross bores 97 and 98 are plugged at their outer ends and so, likewise, is the right-hand end of the auxiliary bore 96. A threaded opening 99 in the lower side of the housing 86 communicates with the central bore 88 and is adapted for connection to the fluid line which runs to the brake operating cylinders.

Positioned within central bore 88 is a check valve having a head 102, the left hand or operative face of which carries an axial cylindrical projection 103 and is provided with an annular recess adapted to receive an annular ring 104 of rubber or rubber-like material. The check valve element is provided with a cylindrical rearward extension 105 having a square transverse opening 106 extending therethrough. As best shown in Figure 11, the rear or right-hand wall of the projection 105, as viewed in Figure 2, is provided with a slot 107 extending parallel to the square opening 106. A cylindrical piston element 108 is positioned within the central bore to the right of the check valve and is provided with a reduced stem 109 which projects through the slot 107 in the projection 105 and carries an enlarged head 110 located within the square opening 106. It will be apparent that as a result of this construction the piston 108 has a lost motion connection with the check valve 102. Surrounding and closely fitting the piston 108 and seated against the shoulder 91 in the housing is a ring 112 of rubber or rubber-like material which is pressed tightly against the shoulder 91 by means of the plug 93. The rubber ring 112 seals the bore 88 from the central opening in the plug 93. To facilitate such sealing action, the ring, if desired, may be provided with an axially extending annular lip 113. A coil spring 114 is positioned between the check valve head 102 and the rubber ring 112 and normally acts to urge the check valve into closed position.

Positioned within the bore 85 is a piston 116 having a stem 117 projecting to the right into engagement with the projection 103 on the check valve 102. A sealing ring 118 of rubber or rubber-like material surrounds the stem 117 of piston 116 and seals the valve unit against leakage through the bore 85 past the piston 116.

The operation of the valve unit 80 is as follows. When the master cylinder is actuated, the brake fluid under pressure enters the opening in the plug 93 and thence flows through cross bore 97, longitudinal bore 96, cross bore 98, opening 90 past the check valve 102 which opens in response to the fluid pressure, and thence through opening 99 to the vehicle brakes to operate the same in the usual manner. The pressure of the fluid from the master cylinder in the cross bore 98 acts on piston 116, forcing it to the left, as viewed in Figure 2, thereby shifting rod 82 to the left and rotating the holding ring 40 by reason of the connection between rod 82 and the projection 81 on the holding ring. This rotation is against the action of the spring pressed plunger 83. In a hydraulic braking system it is essential to reduce to a minimum all displacements of pressure fluid. Consequently, bore 85 and piston 116 are preferably made of very small diameter, in the order of three-eighths of an inch. When the brakes are applied, it is essential to the operation of the device that piston 116 be forced to the left by the brake pressure in order to disengage pin 117 from the check valve 102. Consequently, since it is desirable that the device operate to hold the brakes applied even when they are applied lightly, it is desirable that the plunger 116 be moved to the left under light brake application, that is at a pressure of about fifty pounds per square inch. Accordingly, spring 84, shown best in Figure 6, is made sufficiently light so that it will not resist the effect of a force of fifty pounds per square inch on the piston 116. Therefore, when that or any higher pressure is applied by the brake master cylinder, piston 116 and rod 82 move to the left, rotating the projection 81 and holding ring 40 counterclockwise, as viewed in Figure 6, against the action of spring 84. The brake fluid under pressure in cross bore 98 at the same time passes upwardly through opening 90 and past the valve 102 to the passageway 99 and thence to the vehicle brakes, to cause application thereof. As soon as flow of the brake fluid through opening 90 ceases, even though the pressure is maintained valve 102 is closed by the very light spring 114. This spring is only sufficient to close the valve against the force of gravity and any friction present. If the brake application is relieved before the vehicle comes to a stop, piston 116, under the influence of spring 84, immediately returns to the position shown in Figure 2, thereby opening valve 102 and releasing the brakes. However, if the vehicle is brought to a stop while the brakes are applied, pawl carrier 18, which is fixed to the transmission shaft 11, will come to a stop and pawls 24 will engage ratchet wheel 32 and thereby hold the holding ring 40 with its projection 81 against return movement. If, under these conditions, the brake application has been released, piston 116 will not shift to the right and, consequently, valve 102 will remain closed and trap the fluid in the braking system, thereby maintaining the brakes applied.

When thereafter it is desired to drive the vehicle forwardly, the vehicle is operated in the conventional manner and as soon as a forward driving torque is applied to the transmission shaft 11 the slight movement of the shaft in a forward driving direction necessary to take up clearances and wind-up will rotate the pawl carrier 18 and, consequently, the ratchet wheel 32 and holding ring 40 sufficiently to return the projection 81 and rod 82 to the position shown in Figures 2 and 6, thereby opening valve 102 and releasing the brakes. In order to insure valve opening during such limited rotation of the shaft 11, it is necessary to effect valve opening by a very small movement. It is found that a movement of the projection 81 at a radius of about two inches of approximately three-sixteenths of an inch is available to open the valve. It is for this reason that the pawl and ratchet mechanism is designed to engage on very small increments of relative movement between the two. The resulting limited movement of piston 116 is of advantage because it reduces the fluid displaced by the mechanism during its operation.

In the operation so far described, the function of the plunger 108 and its connection with the valve 102 have been ignored. However, if the brakes are heavily applied, the pressure fluid trapped by check valve 102 may be at a pressure anywhere up to eighteen hundred pounds per square inch. Obviously, the relatively light spring 84, which must collapse on a pressure of fifty pounds per square inch acting against piston 116, cannot release an ordinary check valve against such high pressure unless the effective area of piston 116 was many times the effective area of valve 102. The size of piston 116 is, however, limited by the need to reduce fluid displacement in the unit and is preferably limited to a diameter of about three-eighths of an inch. If the effective area of valve 102 was made enough smaller than the piston 116 to make possible operation of the device on light brake application and release on heavy brake operation, it would therefore have to be exceedingly small and would tend to restrict flow in the brake system. Moreover, a metal to metal check valve, such as a ball check valve, has a tendency to leak when subject to heavy pressure unless made with extreme care; therefore, it is preferred to use a rubber to metal check valve and it is almost impossible to produce a satisfactory rubber to metal check valve of the exceedingly small dimensions required.

Accordingly, there is provided, as shown in the drawings, a rubber to metal check valve having an effective area comparable to that of the piston 116 and means, including plunger 108, are provided to counteract the effect of the trapped brake fluid on valve 102. Since plunger 108 has a lost motion connection with valve 102, it is apparent that when fluid pressure is applied to the fitting 94 by the brake master cylinder the plunger 108 will not affect the check valve 102. The brake fluid under pressure will then flow through cross bore 97, bore 96, cross bore 98, port 90, past the valve 102, and through opening 99 to the brake system. Upon completion of this flow valve 102 will close, trapping the fluid in the system provided the vehicle has been brought to a stop. However, the fluid trapped by valve 102 is then in open communication with the central bore 88 and acts against the left-hand end of the plunger 108. If at this time the brake application is released, the pressure at fitting 94 acting on the right-hand end of plunger 108 will reduce to zero, with the result that the plunger 108 will move to the right, as viewed in Figure 2, taking up all lost motion between the head 110 and the projection 105 of valve 102. The ratio of the area of the port closed by valve 102 to the cross-sectional area of the plunger 108 is so chosen that the trapped brake pressure in central bore 88 acting to the right on plunger 108 will substantially balance all of the force exerted by the trapped fluid tending to hold the valve 102 closed. In view of the fact that a rubber seating ring 104 is employed on the valve 102, that valve does not have a readily ascertained seating area and, therefore, it is necessary to determine the proper cross-sectional area of plunger 108 in any given installation by experiment. In actual practice it is found in one case that a sufficient balance can be obtained to enable the light spring 84 to open valve 102 against eighteen hundred pounds per square inch trapped in the brake system if the plunger 108 has a diameter of .190 inch and the valve seat for valve 102 has an internal diameter of .1875 inch and an external diameter of .3125 inch. In this connection it should be noted that the seating surface of valve seat 89 has a conical angle tending to cause the seating area to approach the outside diameter of the seat. In the particular installation mentioned, this conical angle was between one and two degrees from a plane transverse to the axis of the valve housing. With these proportions, the check valve 102 was found to hold at any pressure and yet could be opened against pressures up to eighteen hundred pounds per square inch by a spring 84 which exerted a total valve releasing force of between seven and eight pounds.

It is further found that with a valve constructed in the manner and of the dimensions given above, if the diameter of the plunger 108 were slightly increased the valve mechanism would operate in the manner described above except that it would open automatically when the pressure at passageway 99 exceeded a predetermined amount. Thus, for example, with a plunger diameter of .195 inch the valve would automatically open when the pressure at passageway 99 exceeded four hundred and fifty pounds per square inch. With plunger diameters intermediate .190 inch and .195 inch, the valve would open at correspondingly higher pressures. In some cases, as, for example, when the unit is employed on heavy trucks where considerable heat is developed in the neighborhood of the brake cylinders, it is advantageous to employ a valve mechanism which will automatically release on overload since otherwise damage to the braking system due to expansion under heat might result when valve 102 is closed.

The reason for the above described operation is not fully understood because it is not possible to ascertain the effective seating area of the valve 102 and, therefore, it is not known whether that area exceeds or is less than the area of a plunger of .195 inch in diameter in the particular case given. It may be that the plunger diameter slightly exceeds the effective seat diameter, in which event the automatic opening would occur when the trapped brake pressure was sufficient to create a valve releasing force which would overcome friction and the effect of spring 114. It is more likely, however, that the plunger diameter in both cases is less than the effective seating area of the valve and that the greater the trapped brake pressure the greater the force exerted tending to hold the valve closed. If that is the case, the automatic opening can be explained by the fact that when the differential in area is reduced by using the larger plunger, the force holding the valve closed is not increased at a sufficiently rapid rate with an increase in trapped brake pressure to hold the valve closed when the trapped pressure exceeds a given amount. In this connection, the yieldable character of one of the valve elements introduces an uncertain factor.

In view of the above, it will be understood that while the valve mechanism is referred to herein and in the appended claims as a balanced valve, it is meant only that the valve is substantially balanced so that it can be opened by a light mechanical force. Actual experience indicates that it is not possible to calculate the effective areas and achieve the desired results. Accordingly, it is necessary for any given design of valve and valve seat to determine the area of the balancing plunger by cut and trial methods to achieve the desired results.

A lost motion connection is provided between the valve 102 and the plunger 108 to take care of the possibility that while the vehicle was in motion and the brakes applied the valve 102 might close momentarily while piston 116 was in its left-hand position, as viewed in Figure 2. If at that instant it was desired to apply the brakes harder without further releasing them, a one-piece balanced valve would either not open or would open too sluggishly to give satisfactory performance. Because of the lost motion connection, valve 102 does not act as a balanced valve in response to pressure from fitting 93 but opens promptly in response to any excess of pressure at the left side of the valve 102. The possibility of valve 102 closing under the above described conditions is remote if the unit is properly balanced and piston 116 is made very small in diameter because in that event valve 102 would be unlikely to close except on sufficient brake pedal releasing movement to permit piston 116 to return to the position shown in Figure 2 and mechanically open valve 102. Therefore, the lost motion connection may be dispensed with under these conditions and the plunger fixed to the valve, if desired.

As shown in Figure 2, an auxiliary lever 120 projects through a slot 121 in the valve housing 86 and is pivoted thereto at 122. The lever has a downwardly projecting end portion extending into a slot 123 in the piston 116. The purpose of the lever 120 is to provide means for rendering the valve mechanism 80 inoperative at will, and any suitable means may be provided for controlling the actuation of the lever 120. It is generally not considered safe to rely on hydraulic brakes for parking purposes because of the possibility of leakage in the wheel cylinders and elsewhere. Accordingly, lever 120 may be connected to the mechanical parking brake by a cable in such a manner that setting of the parking brake opens valve 102. This releases the hydraulic brakes and enables the operator to know when the parking brake is sufficiently applied to hold the vehicle.

It will be observed that the operation of the mechanism disclosed in Figures 1 to 11, inclusive, is entirely automatic when the vehicle is operated in the conventional manner. Thus, during normal driving when the brakes are applied without stopping the car the ratchet mechanism does not engage and, therefore, on an almost imperceptible releasing movement of the master brake cylinder piston the very small piston 116 moves to the right and opens valve 102. Consequently, the brakes operate in the usual manner. The device only holds the brakes applied after the vehicle has been brought to a stop by application of the brakes, and the brakes are automatically released when the vehicle is started forwardly in the conventional manner. When the brakes are being held by the mechanism they are effective to hold the vehicle against unauthorized movement, either forwardly or rearwardly. The device is automatically rendered inoperative at the initial movement of the reverse shift rail toward reverse gear position, and it returns automatically to operative condition either on disengagement of the reverse gearing or on disengagement of the reverse gearing and a subsequent brake application. In addition to the above mentioned functions, the device operates to prevent unauthorized backward movement of the vehicle even though the brakes are not applied, and the releasing means is effective to release the mechanism even when it is heavily loaded by a tendency of the vehicle to roll backwardly. It will be apparent that the mechanism disclosed in Figures 1 to 11 may be employed in any hydraulic or fluid brake system, regardless of the source of the braking pressure or the means for controlling that source.

In addition to the function of preventing forward or rearward movement of the vehicle down a grade, it will be obvious that the device, by holding the brakes applied, will also prevent vehicle movement otherwise induced. For example, it will prevent the forward creep which occurs in vehicles equipped with a non-positive fluid clutch or coupling when the vehicle transmission is in a forward gear and the engine is idling. The action in such case is the same as that when the forward movement is induced by a down grade. If the device is constructed in the manner previously described, the slight torque transmitted to the propeller shaft by the fluid clutch when the engine is idling will take up clearances and backlash but will not wind up the propeller shaft sufficiently to cause release of the valve that holds the brakes applied. However, as soon as the engine is accelerated in the usual manner required to start a fluid clutch equipped vehicle forwardly, the resulting increased torque on the propeller shaft will cause sufficient wind-up or twisting of the shaft (and/or the rear springs if the vehicle has a Hotchkiss drive) to cause release of the brakes.

In this connection, if the vehicle is brought to a stop by application of the brakes when the transmission is in any gear and the friction clutch engaged, the brakes will remain engaged regardless of the engine speed and the torque transmitted through the fluid clutch at the time the vehicle is brought to a stop, and they will automatically release on a slight increase of engine speed above that at the time of stopping. This is due to the fact that at the moment the vehicle is brought to a stop the full wind-up of the propeller shaft due to the then transmitted torque has already occurred and the position of the pawl carrier 21 at the time the pawls engage the ratchet 32 is the position it would assume after that amount of torque was applied to the propeller shaft. Consequently, the ratchet will prevent release of the brakes until such time as the torque is further increased by increasing the engine speed.

The above mentioned characteristic of the device is important because the idling speed of vehicle engines varies widely and, consequently, the torque transmitted at idling speed correspondingly varies. Such variation will not, however, affect the operation of the device. In addition, it enables the device to operate in the same manner regardless of what gear ratio of the transmission has been selected. It will also operate if the hand throttle control has been set to increase the engine speed, as is sometimes necessary when the engine shows a tendency to stall at low speeds. It will also operate as well in cold weather when the fluid in the fluid clutch is more viscous and, therefore, transmits a greater torque for the same engine speed, as it will in hot weather when the torque transmitted is less.

In Figure 12 is illustrated a slightly modified form of the invention for use in connection with air pressure or vacuum operated braking systems. In this form the control valve in the hydraulic system is omitted and the brake holding unit is connected directly to the valve which controls the air pressure or vacuum source.

Referring to Figure 12, it will be seen that the transmission shaft 11a is splined to the hub 19a of the pawl carrier and surrounded by a forward annular projection 34a on the casing 14a, all as more fully disclosed in Figure 1. Likewise, the brake holding ring 40a is journaled on the annular projection 34a, as in the previous modification. However, in this case the valve mechanism 80 of the previous modification is omitted and the projection 81a on the brake holding ring 40a is directly connected to a flexible rod 130 by means of a pin 131 and a clevis 132 on the rod. The flexible rod 130 forms the inner member of a Bowden wire, the outer element 133 of the Bowden wire being secured to the housing 14a by means of a hollow threaded plug 134. So far as the remaining features of the unit disclosed in Figure 12 are concerned, they are otherwise identical to the features disclosed in Figures 1 to 10, inclusive. However, the Bowden wire is connected directly or through any suitable rod and lever connections to the control valve of either an air pressure or a vacuum brake system.

Thus, for example, the Bowden wire 130—133 may be connected to the control valve of an air brake in the manner indicated in Figure 13, which discloses a conventional Westinghouse air brake control valve for motor vehicles. The control valve comprises a casing, generally indicated at 136, having an intake pipe 137 for attachment to a source of air under pressure and exhaust port 138 and a pipe 139 adapted to be connected to the brake operating mechanism. The valve is operated by depressing a plunger 142, the degree of depression determining the amount of pressure supplied to the brake actuators, and the plunger is depressed by means of a roller 143 carried by the pedal 144 pivoted at 145 to the floor 146 of the driver's compartment.

The mechanism so far described and shown in Figure 13 is conventional and of itself forms no part of the present invention. However, in order to effect a connection between the brake holding mechanism disclosed in Figure 12 and the control valve mechanism of Figure 13, a special bell crank lever 148 is pivoted on the pin 145 which carries the pedal 144. The lever 148 has one end lying between the roller 143 of the plunger 142 and its opposite end is bent downwardly, passes through a suitable opening in the floor, and is connected to the flexible rod 130 of the Bowden wire. The housing of the Bowden wire is connected to an angle bracket 149 secured to the underside of the floor 146 in any suitable manner.

The operation of the arrangement disclosed in Figures 12 and 13 is as follows. When the valve control pedal 144 is depressed, bell crank lever 148 is rotated clockwise, thereby forcing the flexible rod 130 of the Bowden wire to the left and causing the brake holding ring 40a to rotate counterclockwise, as viewed in Figure 12. So long as the vehicle remains in motion such movement of the brake holding device 40a has no effect because, as previously described, the pawls do not engage. Consequently, if during movement the vehicle pedal 144 is released, it will be returned to its initial position by a spring 150 and the valve plunger 142 will move upwardly under the influence of a spring in the valve mechanism, thereby returning bell crank 148, rod 130 and brake holding ring 40a to the position shown in the drawings. If, however, during the period that the pedal 144 is depressed the vehicle comes to a stop, the pawls will engage the ratchet in the manner previously described and the brake holding ring 40a will be held in its counterclockwise rotated position, thereby holding the flexible rod 130 of the Bowden wire and preventing return of the bell crank 148. This will maintain the plunger 142 of the air valve 136 depressed and thereby maintain the brakes applied until such time as the vehicle is driven forwardly to release the brake holding ring 40a or that ring is released by other means.

The modified form of the mechanism disclosed in Figure 12 is also peculiarly adapted for use in connection with the type of pressure or vacuum brake actuators or boosters employing a follow-up or movable valve and, accordingly, there is shown in Figures 14 to 17, inclusive, a conventional form of vacuum operated brake actuator employing a follow-up valve and means for connecting that mechanism to the brake holding device of Figure 12.

Referring to Figure 14, there is shown a brake pedal 155 pivoted in the usual manner on a stationary shaft 156 and normally urged into its brake releasing position by means of a spring 157. Instead of being connected directly to the master cylinder of the brake system, the pedal 155 has a lost motion connection with an auxiliary double lever 158, which is likewise pivoted on shaft 156 and embraces the pedal lever 155. The upper end of the auxiliary lever 158 is connected in the usual manner to a rod 159 which runs to and actuates the brake master cylinder (not shown) when the lever 158 is rotated counterclockwise, as viewed in Figure 14. The lower end of the auxiliary lever 158, as best shown in Figures 16 and 17, is pivotally connected to a yoke 160 by means of a pin 161, and the right-hand end of the yoke is provided with a hub 162 which is threaded on the end of a piston rod 163. A lock nut 164 is employed to lock the yoke hub in position on the piston rod. The piston rod carries a piston 165 located in a cylinder 166, which cylinder, in turn, is pivotally mounted by means of a pin 167 to a fixed portion of the frame of the vehicle. The piston is normally held at the left-hand extremity of the cylinder by means of a spring 168. A lug 169 limits movement of the piston 165 to the left at a point which will leave a clearance between the piston and the left-hand end of the cylinder.

The pedal lever 155 is journaled on a hollow sleeve 172 which surrounds pin 161 but is of substantially larger diameter than the pin with the result that the pedal lever may have a limited lost motion movement with respect to the auxiliary lever 158. A valve stem 174 extends through the hollow piston rod 163 and is provided at its left-hand or outer end with a yoke 175, the ends of which are fixed to the sleeve 172. Accordingly, operation of the pedal lever effects a movement of the valve stem 174 before the sleeve 172 contacts the pin 161.

As best shown in Figure 17, the piston rod forms the outer member of a valve mechanism including a valve head 176 secured to the end of the valve rod 174. The right-hand end of the cylinder 166 is in constant communication with a source of vacuum, such as the intake manifold of an internal combustion engine, by means of a conduit 178. When the valve element 176 is in its brake release position, shown in Figure 17, the air at the left-hand side of piston 165 is evacuated through a plurality of openings 180 in the piston rod and thence outwardly toward the right through the open end of the piston rod to the right-hand side of the piston which, as previously indicated, is connected to a source of vacuum. A spring 181, which seats against a snap ring 182 on the end of the piston rod, normally urges the valve element 176 into its release position, shown in Figure 17. The interior of the piston rod at the left-hand side of the valve element 176 is connected to atmosphere through ports 183 in the piston rod, a suitable passageway 184 in the left-hand end of a housing 185 secured to the left-hand end of the cylinder, and an opening 186 in the housing 185. A flexible dust guard 187 protects the piston rod and is secured at one end of the piston rod and at the other end to the housing 185.

The operation of the power mechanism is as follows. When the pedal lever 155 is operated to apply the brakes, the initial movement shifts valve rod 174 from the position shown in Figure 17 to a position in which it permits atmosphere at the left-hand side of the valve element 176 to pass through ports 180 and enter the space at the left-hand side of piston 165, thus forcing piston 165 to the right against the action of spring 168. Movement of the piston pulls the piston rod 163 to the right and, consequently, pin 161, and thereby rotates auxiliary lever 158 in a counterclockwise direction to apply the brakes. It will be observed that in order to maintain the brakes applied it is necessary to maintain pressure on the pedal lever 155 to follow-up the movement of the piston rod and pin 161, the lost motion between the pedal lever 155 and the auxiliary lever 158 being employed to control the position of valve element 176. When the pedal pressure is released, spring 181, assisted by spring 157, returns the valve element 176 to the position shown in Figure 17, thereby causing evacuation of the left-hand end of the cylinder and return of the auxiliary lever 158 to its initial brake release position.

The unit disclosed in Figure 12 may be employed in connection with the type of power operated brake mechanism disclosed in Figures 14 to 17, inclusive, by connecting the flexible rod 130 forming the inner member of the Bowden wire to the flexible rod 130a of the Bowden wire shown in Figure 14. The flexible rod 130a is fixedly secured to the pedal lever 155, and the housing 133a of the Bowden wire is fixedly secured to the auxiliary lever 158. Consequently, on depression of the brake pedal 155 the flexible rod of the Bowden wire is displaced with respect to the housing of the Bowden wire due to the lost motion connection between levers 155 and 158. This displacement shifts lug 81a of the brake holding ring 40a in Figure 12 in a counterclockwise direction into a position in which it will retain the flexible rod of the Bowden wire in its displaced condition, provided the vehicle is brought to rest upon that application of the brakes. As a result of this arrangement, the Bowden wire 130a—133a holds the valve element 176 in a position in which it admits atmosphere to the left-hand end of cylinder 166 and, consequently, holds the brakes applied.

It will be noted that when the mechanism of Figure 12 is connected either to the mechanism of Figure 13 or the mechanism of Figure 14, backward rolling movement of the vehicle will cause counterclockwise rotation of the holding ring and lug 81a and, consequently, open the valve which controls the power brake actuators, thereby causing brake application. Accordingly, as long as there is a source of vacuum or air pressure the device operates to hold the vehicle against unauthorized rearward movement without mechanically locking the propeller shaft. However, in the event of failure of either air pressure or a source of vacuum, the mechanical abutment for the holding ring will prevent unauthorized rearward movement by mechanically holding the transmission shaft, as in the previous modification.

In Figures 18 to 25 is illustrated a modified form of mechanism for releasing the rotatable cam ring when the brake device is holding the propeller shaft against rearward movement down a grade. When the unit is employed on heavy trucks, the load on the dog clutch teeth when the device is automatically holding the vehicle against rearward movement by mechanically blocking rotation of the propeller shaft is exceedingly high and, consequently, the tendency of the dog clutch teeth to separate, as previously described, exerts a very high force between the cam elements 41 and 42. The resulting friction renders it difficult to shift the cam elements to effect release by the reverse rail in the manner achieved by the mechanism disclosed in Figures 1 to 10 because of the fact that such release must occure on a very slight initial movement of the reverse rail that occurs before the reverse gearing actually engages. This movement is not sufficient to make possible the use of any substantial mechanical advantage. Accordingly, in the alternative mechanism embodied in Figures 18 to 25, means are employed for facilitating release under these conditions. This alternative mechanism is identical in all respect to that shown and described in connection with Figures 1 to 10 except that in place of the direct connection between the shift rail 61 and the arm or lever 58 shown in Figures 2, 3, 4 and 7, there is provided an alternative means to release the mechanism to permit driving in reverse. This alternative means is shown in Figures 18 to 25, inclusive. Thus, Figure 18 is a fragmentary view corresponding to Figure 7 but showing only those portions of the mechanism of Figures 1 to 10 that are changed in the alternative construction, corresponding parts of the construction of Figures 1 to 10 being given similar reference characters with the suffix a.

In Figure 18 the cam ring 41a, which corresponds to the cam ring 41 of the previous form, has an arm or lever 58a projecting into a recess 190 in the housing which is identical to the recess which receives the lever 58 in Figure 7 except that it is located at the bottom of the housing 14. Lever 58a differs from lever 58 only in that it omits the roller 59 on the latter. The brake holding ring 40a is provided with a projection 54a which lies in the same recess 190 that accommodates the lever 58a on the rotatable cam ring 41a. The projection 54a is adapted to sustain the load incident to holding the vehicle against retrograde movement in the same manner that the projection 54 performed that function in the previous modification. However, the projection 54a, instead of engaging a fixed abutment wall, engages a plunger 191 positioned within a plug 192 which is screwed into the casing.

As best shown in Figure 19, the plug 192 also contains a second plunger 193 which is adapted to engage the lever 58a on the rotatable cam ring 41a and shift it to the left to effect release of the cam and thereby render the holding device inoperative by permitting disengagement of the clutch teeth. Plunger 191 is slidable in a bore 194 in the plug 192 and is provided with an enlarged head 195 positioned within a counterbore 196. The counterbore 196 is closed by means of a plug 197, and a spring 198 normally urges plunger 191 to the left, as viewed in Figure 19. In this position, as shown in Figure 19, there is a clearance between plunger 191 and projection 54a sufficient to permit that rotation required to set the holding ring 40a when the brakes are applied. Plunger 193 is mounted in a bore 200, the bottom end of which is conical in form, as indicated at 201, to form a seat for a rotatable valve element 202 having a stem 203 which projects from the outer end of the plug 192. A passageway 204 connects counterbore 196 with the bore 200 and the flow of fluid through the communicating passageway 204 is controlled by the valve 202 which is provided with a pair of communicating passageways 205 and 206, the former of which leads to the bore 200 and the latter extends transversely in a direction in which it may be aligned with the passageway 204 upon rotation of the valve 202.

As best shown in Figures 20 to 23, inclusive, plug 192 is also provided with two additional bores 208 and 209. The bore 208 may have communication with bore 200 by means of a passageway 210 which lies in the same transverse plane as passageway 204 and is adapted to communicate with the passageway 206 in valve 202 when the valve is rotated counterclockwise, as viewed in Figure 23. The bore 209, as best shown in Figure 22, communicates with a cross bore 212 which contains a ball check valve 213 which is normally held closed by a spring 214. The check valve is arranged in such a way as to permit flow from bore 209 to cross bore 212, but it will not permit return flow. The cross bore 212, in turn, intersects counterbore 196 in order to provide communication from bore 209 to counterbore 196.

It will be noted that the recess 190 in the housing 14a is located at the lowermost portion of the housing and, consequently, is normally filled with lubricating oil, which will completely immerse the inner end of the plug 192.

All of the remaining features of the unit disclosed fragmentarily in Figures 18 to 25 are identical to the construction illustrated and described in connection with Figures 1 to 11, inclusive. However, if desired, the modified construction disclosed in Figure 12 for operating a power brake valve may be employed in lieu of the valve mechanism 80 of Figures 1 to 11, inclusive.

The operation of the device is as follows. When the vehicle begins to roll rearwardly, the previously described ratchet mechanism engages, rotating the brake holding ring 40a counterclockwise, as viewed in Figure 18, and bringing the projection 54a into engagement with the plunger 191. Under these conditions, the valve 202 is normally turned so that it communicates with passageway 210, which is shown in Figure 23, and closes communication between bore 200 and counterbore 196. Consequently, the fluid at the right-hand side of the plunger 191 is trapped in the counterbore 196 and the plunger 191 effectively sustains the load applied by the ratchet mechanism and holds the vehicle against rolling backwardly. When it is desired to release the mechanism to permit rearward movement, valve 202 is rotated by means of lever 216 until it places counterbore 196 in communication with bore 200. The fluid pressure in the counterbore 196 under the influence of plunger 191 and the load incident to holding the vehicle are then transmitted through passageway 204 to the counterbore 200, forcing plunger 193 outwardly against the projection 58a on the rotatable cam ring 41a, thus rotating the cam ring clockwise, as viewed in Figure 18, to release the cams and permit disengagement of the clutch teeth in the manner described in connection with the previous modification. It will be observed that the load sustained by the mechanism is employed to release it and that it is only necessary to rotate the small control valve 202 to effectively render the holding mechanism inoperative.

As soon as the clutch teeth are disengaged, the load on the plungers 191 and 193 is relieved and plunger 191 is then returned to the position shown in Figure 19 by means of the spring 198. This returns the brake holding ring to its initial position. During the return movement of the plunger 191, counterbore 196 is maintained filled with fluid through bore 209 and cross bore 212, the ball check valve 213 opening to permit flow in this direction to the counterbore 196. The vehicle will then be in motion and, therefore, the clutch teeth will not re-engage until the valve 202 is returned to its initial position and the vehicle comes to rest. After valve 202 is returned to its initial position, passageways 208 and 210 form an outlet for bore 200, thus permitting return of plunger 193 under the influence of plunger 64a or spring 72 of Figure 7 when the brakes are applied.

The handle 216 of the control valve 202 may be operated by any suitable instrumentality, such as a connection to the reverse shift rail of the transmission as shown in Figure 23a. As there shown, the reverse shift rail 61 projects from the rear of the transmission casing 223 and is connected by a pin 199 to a slot 207 in a lever 211 pivoted at 217 to the housing 14a of the brake holding device. The lower end of the lever 211 is slotted at 218 to receive a pin 219 on the end of the handle 216 of the control valve 202. It is apparent that on shift into reverse rail 61 will move rearwardly and thereby effect rotation of valve stem 203 as required to release the mechanism.

In Figures 24 and 25 there is shown a novel control arrangement for the valve 216 which is particularly designed to meet the needs of heavy truck operation. In this connection it should be mentioned that it is exceedingly difficult when a heavy truck is stopped on a forward down grade to drive it in reverse because of the fact that in the brief interval between the release of the brakes and the actuation of the throttle to drive the vehicle rearwardly the vehicle begins to move forwardly and it is very difficult for the clutch to pick up the heavy weight and drive the vehicle due to excessive clutch chatter. However, when the brake holding mechanism of the present invention is employed, the mechanism will prevent forward movement by holding the brakes applied and thus will leave the driver's right foot free to actuate the throttle. In order to drive the vehicle rearwardly without permitting any forward motion prior to full clutch engagement, means are provided in Figure 24 for synchronizing release actuation of the lever 216 with actuation of the throttle after the vehicle has been shifted into reverse gear.

Referring to Figure 24, the lever 216 is connected to the flexible rod 220 of a Bowden wire, the outer casing 221 of which is fixed to bracket 222 mounted on the side of the transmission casing 223. The opposite end of the flexible rod 220 is connected to a bell crank lever 224 pivoted at 225 on a bracket 226 on the underside of the floor 227 of the driver's compartment immediately beneath the throttle pedal 228.

As best shown in Figure 25, the forwardly directed arm 226 of the bell crank lever 224 is bent rearwardly at its extremity to form a U-shaped end portion adapted to embrace the push rod 229 which connects the throttle pedal 228 to the carburetor of the vehicle. A flat projection 230 is welded or otherwise fixed to the rod 229 and is adapted to move with the rod between the legs of the U-shaped extremity of the leg 226 of the bell crank lever. During normal operation of the vehicle the rod 229, with its projection 230, moves freely through the U-shaped extremity of the bell crank lever without affecting the position of the bell crank lever and, consequently, without shifting the valve lever 216.

The extremity of arm 226 of the bell crank lever is provided with an internally threaded boss 232 adapted to receive a threaded fitting 233 having an axial bore in which is slidable a plunger 234. The projection 230 on rod 229 terminates at its lower end, as viewed in Figure 24, immediately above path of movement of plunger 234. Consequently, if the plunger 234 is moved upwardly, as viewed in Figure 25, into the path of movement of the projection 230 prior to actuation of the throttle pedal 228, depression of the throttle pedal thereafter will cause engagement between the projection 230 and the plunger 234 and, consequently, clockwise rotation of the bell crank lever 224. Such clockwise rotation pulls the flexible rod 220 of the Bowden wire to the right, as viewed in Figure 24, thus shifting the valve 202 to the position shown in Figure 23 in which it permits release of the brake holding mechanism.

Plunger 234 is operatively connected to the reverse shift rail 61a of the transmission in the manner shown in Figure 24. As there shown, the rear wall of the transmission casing contains an internally threaded boss 236 which receives a fitting 237 having an axial bore 238 in communication with a counterbore 239. A plunger 240 is received in the bore 238 and carries an enlargement 241 which slides in the counterbore 239. A spring 242 normally urges the plunger 240 to the right, as viewed in Figure 24, into contact with the end of the reverse shift rail 61a. Plunger 240 is connected at its left-hand end to the flexible rod 243 of a Bowden wire having an exterior member 244 which is fixedly secured to the fitting 237 by means of a collar 245. The opposite end of the flexible rod 243, as best shown in Figure 25, is fixed to the plunger 234 and the corresponding end of the outer Bowden wire element 244 is fixed to the fitting 233 by a collar 246. As a result of this arrangement, when the transmission is shifted into reverse gear the shift rail 61a moves rearwardly, forcing plunger 240 to the left and thereby shifting the flexible rod 243 of the Bowden wire connection in a direction to advance the plunger 234 into the path of movement of the projection 230 on throttle rod 229.

As a result of this arrangement, normal actuation of the throttle pedal is not interfered with in any way, but after the transmission is shifted into reverse gear and the driver is re-engaging the clutch in order to take up the load and drive the vehicle rearwardly, he will necessarily step on the throttle pedal in order to develop sufficient starting torque. At the instant this is done, the brake holding mechanism will release, thus permitting disengagement of the brakes and rearward driving of the vehicle without any opportunity for the vehicle to start rolling forwardly down a grade. If the vehicle is facing either upwardly or downwardly on a grade, it is unnecessary to release the brake holding mechanism by means of valve 202 if it is desired to drive forwardly because in this case the brakes are either not held applied or they will release upon application of forward driving torque to the transmission shaft. When the vehicle is facing forwardly up a grade and it is desired to move rearwardly, it is only necessary to shift into reverse gear and step on the throttle slightly to effect release of the mechanism. This can be done either with or without engaging the clutch.

With the mechanism of Figures 18 to 25, inclusive, the valve 202 will be returned to the position in which it places bore 200 in communication with cross bore 210 as soon as the vehicle is shifted out of reverse gear and the throttle pedal 228 is released. The holding unit will then be returned to operative position in the manner and under the conditions described in connection with Figures 1 to 10, inclusive. Thus, if the spring in plunger 64a is adjusted to exert very light pressure and a spring connection such as the spring 12 of Figure 7 is employed between the holding ring and the cam ring, the unit will not be restored to operative position until after the vehicle brakes are applied.

In Figure 26 is disclosed still another modified form of mechanism for releasing the cam which holds the brake holding device in operative condition, the form shown in Figure 26 being particularly adapted for employment in trucks or heavy vehicles which are subject to a very heavy holding strain when the device is holding the vehicle against movement rearwardly down a grade.

The mechanism disclosed in Figure 26 is identical to that disclosed in Figures 1 to 10, inclusive, except that the projection 54b on the holding ring 40b, instead of engaging a fixed abutment such as the abutment 56 of Figure 6, engages the nose 250 of a generally semi-circular lever 251 which is pivoted by means of a relatively heavy pin 252 to the housing 14b. The opposite extremity of the lever 251 is pivoted to the arm 58b on the rotatable cam ring 41b. This connection is made by means of a pin 253 carried by the lever 251 and extending through a slot 254 in the arm 58b. The arm 58b corresponds to arm 58 in Figure 7 and cooperates in the same manner with a cam 60b on an extension 61b of the reverse shift rail and with a spring pressed plunger 64b, to control release of the holding device.

As a result of this arrangement, when the holding device is in operative condition and the vehicle begins to roll rearwardly down a slope the projection 54b on the holding ring 40b will engage the nose 250 of the lever 251 which acts as an abutment and prevents further rotation of the holding ring and, consequently, further backward movement of the vehicle. It will be noted that the reaction to the force exerted by the projection 54b on the nose 250 of the lever 251 is transmitted to the release arm 58b in a direction to cause releasing movement of the cam ring 41b. However, the mechanical advantage of the leverage system is such that the force transmitted to the release arm 58b is only a small fraction of the force exerted by the projection 54b on the nose 250 of the lever and is insufficient to cause actual movement of the release arm 58b against the relatively high friction forces present due to the tendency of the clutch teeth to separate axially under the load imposed by the nose 250 of lever 251 against the projection 54b. The friction forces acting on the cam ring are proportional to the force acting on the nose 250 of the lever and, consequently, the force tending to release the cam ring 41b is likewise proportional to but slightly less than the force required to move the ring. Consequently, when the transmission is shifted into reverse gear to effect release of the holding mechanism, the force exerted by the cam 60b on the extension of the reverse shift rail is greatly augmented by the lever 251. This arrangement, therefore, makes it possible to release the holding device under the heavy loads which may be imposed in large trucks by the slight free movement of the reverse shift rail prior to actual reverse gear engagement. The form of release mechanism disclosed in Figure 26 may be employed in a mechanism in which the projection 81b on the holding ring is connected by a pin and clevis connection to a rod for operating the control valve of a power brake system, as in Figure 12, if desired, instead of merely abutting a valve operating rod such as the rod 82 of Figure 2.

As illustrated in Figure 26, the holding unit is returned to operative position by means of a spring pressed plunger 64b in the manner described in connection with the plunger 64 of Figure 7. It will be understood, however, that as in the case of Figure 7 the spring operating on the plunger 64b may be made sufficiently weak so that it just fails to overcome the static friction, and an auxiliary spring corresponding to spring 72 of Figures 6 and 7 between the cam ring and the holding ring may be employed to cause re-engagement of the unit only after the transmission is shifted out of reverse gear and the vehicle brakes are applied.

All of the mechanisms so far described have been disclosed as mounted at the rear of the transmission of the vehicle and connected to the transmission shaft. However, it should be understood that the device may be mounted anywhere in that portion of the power transmitting system between the vehicle clutch and the driven wheels which rotates with the driven wheels at all times. Thus, in heavy trucks, for example, it is advantageous to mount the unit in the rear axle pinion housing in order to insure brake or hill holding performance of the device even though the propeller shaft of the truck should break.

Accordingly, there is shown in Figures 27 to 29, inclusive, the manner in which the holding unit may be installed in the rear axle pinion housing.

Referring to Figure 27, the rear axle pinion, which is indicated at 260, is fixed to a pinion shaft 261 in the usual manner and is adapted to drive either directly or through intermediate gearing the differential in the rear axle housing. The pinion shaft is mounted in a pair of roller bearings, indicated generally at 262 and 263, carried in the usual manner by a housing 264 which may be bolted by means of flange 265 to the rear axle housing. The structure so far described is conventional except that the housing 264 is slightly enlarged at its left-hand end to provide room for the brake holding mechanism enclosed therein.

There is provided an auxiliary spacer sleeve 266 secured to the left-hand or forward end of the housing 264 and projecting into the housing. The spacer 266 has a forwardly projecting annular sleeve 267 of reduced diameter which surrounds but is free of connection to the shaft 261 and which corresponds in function to the forwardly projecting sleeve 34 shown in Figure 1.

It will be noted that in applying the holding mechanism to the rear axle pinion housing the relative positions of the parts are reversed, as compared with Figure 1. Thus, the pawl carrier 18c is fixed to the shaft 261 at the rear end of the device and carries pawls 24c which have rearward projections 28c co-operating with a ring 30c corresponding to ring 30 of Figures 1 and 2. The pawls 24c co-operate with a ratchet wheel 32c having clutch teeth 36c adapted to co-operate with clutch teeth 38c on the holding ring 40c.

It will be noted that in Figure 27 the device is shown in its inoperative position, in which the clutch teeth 36c and 38c are disengaged. A movable cam ring 41c is adapted to co-operate with a stationary cam ring 42c to shift the clutch teeth into engagement.

As shown in the fragmentary sectional view of Figure 28, the ratchet teeth 33c project in a counterclockwise direction, as viewed looking toward the front of the vehicle or to the left, as shown in Figure 27, and the pawls 24c project in the opposite direction. In other words, the pawl carrier 18c rotates clockwise, as viewed in Figure 28, when the shaft 261 is rotating in its reverse direction. The clutch teeth 36c and 38c are sloped in the manner illustrated in Figure 29, since on reverse rotation of the ratchet wheel 32c by the pawls the teeth 36c move upwardly, as viewed in Figure 29.

Except for the fact that the parts of the holding unit are located in reverse relation to each other and the pawl carrier is somewhat reduced in diameter because of space requirements, the mechanism disclosed in Figure 27 is identical to that disclosed in Figures 1 to 10, inclusive, and operates in the same manner. However, it will be apparent that the mechanism of Figure 27 may be connected in the manner shown in Figure 12 with an air pressure or vacuum brake control valve and it may embody the release mechanism of Figures 18 to 25, inclusive, or Figure 26, if desired, in lieu of the release mechanism shown in Figure 7. In addition, it will be apparent that if the release mechanism of Figures 18 to 23, inclusive, is employed in connection with the mechanism of Figure 27, it may be controlled in the manner disclosed in Figures 24 and 25 except, of course, that the brake controlling valve lever 216 and the valve and plunger mechanism in plug 192 will be mounted in the rear axle housing instead of on the transmission casing. When the release mechanism of either Figure 7 or Figure 26 is employed in the axle housing mounting of Figure 27, it is necessary to connect the reverse shift rail to the releasing cam which corresponds to cam 60 by means of a Bowden wire or other linkage like that shown at 243 and 244 in Figure 24.

When the unit is mounted in the rear axle housing in the manner indicated in Figure 27 on a Hotchkiss drive vehicle, there is sufficient flexibility in the springs which mount the rear axle to permit the limited forward driving rotation of the shaft 261 necessary to release the brakes before the driven wheels are rotated with respect to the axle housing. The necessary limited forward rotation of the shaft 261, after it has taken up clearances and wound up the axle shafts, will be accompanied by a slight rotation of the axle housing about the axis of the wheels.

The expression "check valve" as used in the claims refers to a valve which will open in response to an excess of pressure at one side and closes in the absence of an excess at said side. A balanced check valve is one in which the forces exerted by the pressure of the trapped fluid on the movable valve element are balanced. A substantially balanced check valve is one in which the net force exerted on the movable valve element by the trapped fluid in the path of valve movement is small compared with the force which would be exerted by the trapped fluid on an area equal to that of the port closed by the valve.

What is claimed is:

1. In a power brake system for motor vehicles having a power transmission system including a member permanently connected to a driven wheel of the vehicle, wheel braking mechanism, fluid power means operatively connected to said braking mechanism, a control valve for controlling actuation of said power means, means connected to said power transmission member and operable in response to bringing the vehicle to rest through application of the brakes by said power means for holding said control valve in a position in which it causes said power means to maintain said brakes applied, and means operable automatically upon application of forward driving torque to said member of the power transmission system of said vehicle to render said last mentioned means inoperative before the vehicle is moved.

2. In a power brake system for motor vehicles having a power transmission system including a rotating member permanently connected to a driven wheel of the vehicle, wheel braking mechanism, fluid power means operatively connected to said braking mechanism, a control valve for controlling actuation of said power means, an element having a one-way driving connection with said rotating member of said power transmission system, said driving connection being effective only when said element tends to move relative to said member in a direction that would apply a forward driving force to said member, a connection between said valve and said element for moving said element with respect to said member in the non-driving direction when the valve is shifted into brake applying position, said connection being effective to hold said valve in brake applying position when said element is held against return movement by said member.

3. In a power brake system for motor vehicles having a power transmission system including a rotating member permanently connected to a driven wheel of the vehicle, a wheel braking system, a fluid power motor having a pair of parts one of which is connected to a stationary part of the vehicle and the other of which is movable relative to the first part, means operatively connecting the movable part of said fluid power motor to the braking system, a valve for controlling actuation of said fluid power motor, said valve having a pair of valve elements one of which is connected to said movable part and the other of which has a lost motion connection with said movable part, an element having a one way driving connection with said rotating member of said power transmission system, said driving connection being effective only when said element tends to move relative to said member in a direction that would apply a forward driving torque to said member, means connecting said valve to said element for moving said element with respect to said member in the non-driving direction when the valve elements are shifted relative to each other in a direction to cause application of the brakes, said connection being effective to hold said valve elements in the relative position in which they maintain the brakes applied when said element is held against return movement by said member.

4. In a power brake system for motor vehicles having a power transmission system including a rotating member permanently connected to a driven wheel of the vehicle, a wheel braking system, a fluid power motor having a pair of parts one of which is connected to a stationary part of the vehicle and the other of which is movable relative to the first part, means operatively connecting the movable part of said fluid power motor to the braking system, a valve for controlling actuation of said fluid power motor, said valve having a pair of valve elements one of which is connected to said movable part and the other of which has a lost motion connection with said movable part, an element having a one-way driving connection with said rotating member of said power transmission system, said driving connection being effective only when said element tends to move relative to said member in a direction that would apply a forward driving torque to said member, means connecting said valve to said element for moving said element with respect to said member in the non-driving direction when the valve elements are shifted relative to each other in a direction to cause application of the brakes, said connection being effective to hold said valve elements in the relative position in which they maintain the brakes applied when said element is held against return movement by said member, said last named means including a Bowden wire having its housing connected to one of said valve elements and its wire connected to the other valve element.

5. In a power brake system for motor vehicles having a power transmission system including a member permanently connected to a driven wheel of the vehicle, wheel braking mechanism, fluid power means operatively connected to said braking mechanism, a control valve for controlling actuation of said power means, means connected to said member of the power transmission system and operable upon rearward movement of the vehicle for opening said control valve to cause application of the brakes by said power means, and means operable upon application of a forward driving torque to the power transmission system to shift said control valve to brake releasing position before the vehicle is moved.

6. A hill holding mechanism for a motor vehicle having brakes, a power transmission system including disengageable reverse gearing, said mechanism including means connected to the power transmission system for automatically preventing rearward movement of the vehicle, means to render the first means inoperative in order to permit driving in reverse gear, said last-mentioned means being effective to maintain said first means inoperative during a subsequent driving of the vehicle in a forward gear and means operated only upon application of the vehicle brakes to return said first means to its operative position, said last mentioned means being operative only after the reverse gearing is disengaged.

7. A hill holding mechanism for a motor vehicle having brakes, a power transmission system including disengageable reverse gearing, said mechanism including means connected to the power transmission system for automatically applying the brakes upon rearward movement of the vehicle, means to render the first means inoperative in order to permit driving in reverse gear, said last-mentioned means being effective to maintain said first means inoperative during a subsequent driving of the vehicle in a forward gear and means operated only upon application of the vehicle brakes to return said first means to its operative position, said last mentioned means being operative only after the reverse gearing is disengaged.

8. A hill holding mechanism for a motor vehicle having brakes, an accelerator pedal, a power transmission system including disengageable reverse gearing, said mechanism including means connected to the power transmission system for automatically preventing rearward movement of the vehicle, means operative when said accelerator pedal is actuated to render the first means inoperative, said last mentioned means being operative only after the shifting means for the reverse gearing is moved in a direction to engage the reverse gearing, and means operated upon application of the brakes to return said first means to its operative position, said last mentioned means being operative only after the reverse gearing is disengaged.

9. In a hill holding mechanism for motor vehicles having a throttle control element and a power transmission system including selectively engageable reverse gearing, said mechanism including means connected to the power transmission system for automatically preventing rearward movement of the vehicle, means for rendering said first mentioned means inoperative, and an actuator for said last means operated upon movement of the throttle control element in a direction to open the throttle only after the reverse gearing is engaged.

10. In a hill holding mechanism for motor vehicles having a throttle control element and a power transmission system including selectively engageable reverse gearing, said mechanism including means connected to the power transmission system for automatically preventing rearward movement of the vehicle, means for rendering said first mentioned means inoperative, a connection between the throttle control element and the last named means for actuating the last named means when the control element is shifted in a direction to open the throttle, and means rendering said connection inoperative except when the reverse gearing is engaged.

11. In a brake holding mechanism for motor vehicles having brakes, a throttle control element, a power transmission system including disengageable reverse gearing, said mechanism including means associated with the power transmission system for automatically holding the brakes applied after the vehicle is brought to rest by application of the brakes, means for rendering said first named means inoperative, and an actuator for said last means operated upon movement of the throttle control element in a direction to open the throttle only after the reverse gearing is engaged.

12. In a brake holding mechanism for motor vehicles having brakes, a throttle control element, a power transmission system including disengageable reverse gearing, said mechanism including means associated with the power transmission system for automatically holding the brakes applied after the vehicle is brought to rest by application of the brakes, means for rendering said first named means inoperative, a connection between the throttle control element and the last named means for actuating the last named means when the control element is shifted in a direction to open the throttle, and means rendering said connection inoperative except when the reverse gearing is engaged.

13. In a hill holding device for a motor vehicle having a power transmission system, a member rotatable with the power transmission system, a member having a one-way driving connection with the first member which connection is effective only when the power transmission is operated in reverse direction, a third member, a dog clutch connecting the second member and third members, the teeth of the dog clutch being formed to cause automatic disengagement of said dog clutch when a torque is applied thereto in a direction corresponding to reverse operation of the transmission system, cam means for preventing disengagement of said dog clutch by said applied torque, means forming a movable abutment to resist reverse movement of the third member and thereby prevent reverse movement of the vehicle, and means for transmitting the force exerted on said abutment by the third member to said cam in the direction in which the cam must be moved to release the cam and permit clutch disengagement.

14. In a hill holding device for a motor vehicle having a power transmission system, a member rotatable with the power transmission system, a member having a one-way driving connection with the first member which connection is effective only when the power transmission is operated in reverse direction, a third member, a dog clutch connecting the second member and third members, the teeth of the dog clutch being formed to cause automatic disengagement of said dog clutch when a torque is applied thereto in a direction corresponding to reverse operation of the transmission system, cam means for preventing disengagement of said dog clutch by said applied torque, means forming a movable abutment to resist reverse movement of the third member and thereby prevent reverse movement of the vehicle, and means connecting said abutment to the cam for transmitting a portion of the load exerted on the abutment by the third member to the cam in a direction to assist in releasing the cam and thereby permitting disengagement of the dog clutch.

15. In a hill holding device for a motor vehicle having a power transmission system, a member rotatable with the power transmission system, a member having a one-way driving connection with the first member which connection is effective only when the power transmission is operated in reverse direction, a third member, a dog clutch connecting the second member and third members, the teeth of the dog clutch being formed to cause automatic disengagement of said dog clutch when a torque is applied thereto in a direction corresponding to reverse operation of the transmission system, cam means for preventing disengagement of said dog clutch by said applied torque, means forming a movable abutment to resist reverse movement of the third member and thereby prevent reverse movement of the vehicle, means for transmitting the force exerted on said abutment by the third member to said cam in the direction in which the cam must be moved to release the cam and permit clutch disengagement, and means for controlling the transmission of said force from the third member to the cam.

16. In a hill holding device for a motor vehicle having a power transmission system, a member rotatable with the power transmission system, a member having a one-way driving connection with the first member which connection is effective only when the power transmission is operated in reverse direction, a third member, a dog clutch connecting the second member and third members, the teeth of the dog clutch being formed to cause automatic disengagement of said dog clutch by said applied torque, hydraulic means forming an abutment to resist reverse movement of the third member and thereby prevent reverse movement of the vehicle, hydraulic means for effecting cam release, a fluid connection between said hydraulic means, and a valve for controlling said connection.

17. In a hill holding device for a motor vehicle having a power transmission system, a member rotatable with the power transmission system, a member having a one-way driving connection with the first member which connection is effective only when the power transmission is operated in reverse direction, a third member, a dog clutch connecting the second member and third members, the teeth of the dog clutch being formed to cause automatic disengagement of said dog clutch when a torque is applied thereto in a direction corresponding to reverse operation of the transmission system, cam means for preventing disengagement of said dog clutch by said applied torque, resilient means normally acting to move said cam into the position in which it prevents clutch disengagement, a hydraulic abutment for resisting reverse movement of said third member and thereby preventing reverse movement of the vehicle, said abutment including a piston and cylinder and a valve which when closed traps the fluid in the cylinder, a hydraulic piston and cylinder for effecting cam release, and connections between said last mentioned piston and cylinder whereby when said valve is in the position in which it traps fluid in the first cylinder it vents the second cylinder and when said valve is shifted out of said position it connects said cylinders.

18. A hill holding mechanism for a motor vehicle having brakes, an accelerator pedal, a power transmission system including reverse gearing and means for shifting the reverse gearing into and out of engagement, said mechanism including means connected to the power transmission system for automatically preventing rearward movement of the vehicle, means operatively associated with the power transmission system for automatically holding the brakes applied after the vehicle is brought to rest by application of the brakes, a device effective when actuated in one direction to render inoperative said means for preventing rearward movement and said means for holding the brakes applied and effective when returned to its normal position to render both said means operative, means operative when the accelerator pedal is depressed to shift said device in said one direction, said last mentioned means being operative only after the transmission is shifted into reverse gear, and means operated upon application of the brakes to return said device to its normal position, said last mentioned means being operative only after the reverse gearing is disengaged.

19. A hill holding mechanism for a motor vehicle having brakes, a power transmission system including reverse gearing and means for shifting the reverse gearing into and out of engagement, said mechanism including means connected to the power transmission system for automatically preventing rearward movement of the vehicle, means operatively associated with the power transmission system for automatically holding the brakes applied after the vehicle is brought to rest by application of the brakes, a device effective when actuated in one direction to render inoperative said means for preventing rearward movement and said means for holding the brakes applied and effective when returned to its normal position to render both said means operative, means operative to shift said device in said one direction in order to permit driving in reverse gear, and means operated upon application of the brakes to return said device to its normal position, said last mentioned means being operative only after the reverse gearing is disengaged.

20. A hill holding mechanism for a motor vehicle having brakes, an accelerator pedal, a power transmission system including disengageable reverse gearing, said mechanism including means connected to the power transmission system for automatically applying the brakes upon rearward movement of the vehicle, means operative when said accelerator pedal is actuated to render the first means inoperative, said last mentioned means being operative only after the reverse gearing is engaged, and means operated upon application of the brakes to return said first means to its operative position, said last mentioned means being operative only after the reverse gearing is disengaged.

CHARLES M. JAMESON.

CERTIFICATE OF CORRECTION.

Patent No. 2,381,755.　　　　　　　　　　　　　　　　August 7, 1945.

CHARLES M. JAMESON.

It is hereby certified that error appears in the printed specification of the above numbered patent requiring correction as follows: Page 3, first column, line 36, for "being exerted tending to rotate the ratchet wheel" read --being slightly in excess of the angle of repose, for--; page 9, second column, line 65, for "respect" read --respects--; and that the said Letters Patent should be read with this correction therein that the same may conform to the record of the case in the Patent Office.

Signed and sealed this 27th day of November, A. D. 1945.

Leslie Frazer (Seal)　　　　　　　　　　First Assistant Commissioner of Patents.